US012346589B2

(12) United States Patent
Luo et al.

(10) Patent No.: US 12,346,589 B2
(45) Date of Patent: Jul. 1, 2025

(54) DIRECT WRITE STRATEGY FOR A STORAGE SYSTEM, DATA PROCESSING METHOD, APPARATUS, NODE, AND STORAGE MEDIUM

(71) Applicant: Huawei Technologies Co., Ltd., Shenzhen (CN)

(72) Inventors: Siwei Luo, Chengdu (CN); Feng Wang, Chengdu (CN); Yi He, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 14 days.

(21) Appl. No.: 17/934,699

(22) Filed: Sep. 23, 2022

(65) Prior Publication Data

US 2023/0015979 A1   Jan. 19, 2023

Related U.S. Application Data

(63) Continuation of application No. PCT/CN2021/077840, filed on Feb. 25, 2021.

(30) Foreign Application Priority Data

Mar. 25, 2020  (CN) .......................... 202010220314.8
Jun. 22, 2020  (CN) .......................... 202010574780.6

(51) Int. Cl.
     G06F 3/06  (2006.01)
(52) U.S. Cl.
     CPC .......... G06F 3/0644 (2013.01); G06F 3/0683 (2013.01); *G06F 3/0604* (2013.01)

(58) Field of Classification Search
     CPC ..... G06F 3/0644; G06F 3/0683; G06F 3/0604
     See application file for complete search history.

(56) References Cited

U.S. PATENT DOCUMENTS

| 2004/0044871 | A1* | 3/2004 | Weber ................... G06F 3/0631 |
| | | | 711/173 |
| 2004/0123017 | A1* | 6/2004 | Henry ................... G06F 3/0689 |
| | | | 711/6 |
| 2008/0126839 | A1 | 5/2008 | Sangapu et al. |
| 2017/0083454 | A1 | 3/2017 | Ramalingam et al. |

(Continued)

FOREIGN PATENT DOCUMENTS

| CN | 106201350 A | 12/2016 |
| CN | 106569739 A | 4/2017 |

(Continued)

*Primary Examiner* — Gurtej Bansal
(74) *Attorney, Agent, or Firm* — SLATER MATSIL, LLP

(57) ABSTRACT

This application discloses a storage system, a data processing method, an apparatus, a node, and a storage medium, and pertains to the field of data storage technologies. In the method, a client determines an address that is in a storage unit and that is used to store to-be-written data, and sends the to-be-written data to a first storage device that is in a storage node and that is corresponding to the storage unit, so that the first storage device stores the to-be-written data while a CPU of the storage node does not need to determine a hard disk LBA corresponding to virtual address space, and a hard disk does not need to determine a corresponding physical address based on the hard disk LBA.

19 Claims, 13 Drawing Sheets

(56) References Cited

U.S. PATENT DOCUMENTS

2017/0235499 A1* 8/2017 Xu ..................... G06F 9/5016
                                                                711/170
2018/0341554 A1* 11/2018 Emami ............... G06F 11/1446
2019/0294339 A1* 9/2019 Bolkhovitin .......... G06F 3/0607

FOREIGN PATENT DOCUMENTS

| CN | 109085999 A | 12/2018 |
|----|-------------|---------|
| WO | 2007089502 A1 | 8/2007 |

* cited by examiner

DIRECT WRITE STRATEGY FOR A STORAGE SYSTEM, DATA PROCESSING METHOD, APPARATUS, NODE, AND STORAGE MEDIUM

CROSS-REFERENCE TO RELATED APPLICATIONS

This application is a continuation of International Application No. PCT/CN2021/077840, filed on Feb. 25, 2021, which claims priority to Chinese Patent Application No. 202010220314.8, filed on Mar. 25, 2020 and Chinese Patent Application No. 202010574780.6, filed on Jun. 22, 2020. All of the aforementioned applications are hereby incorporated by reference in their entireties.

TECHNICAL FIELD

This application relates to the field of data storage technologies, and in particular, to a storage system, a data processing method, an apparatus, a node, and a storage medium.

BACKGROUND

With the development of data storage technologies, increasingly more data may be stored in a storage system that includes a client, a metadata node, and a storage node.

Currently, a process in which the client writes data to the storage system may be as follows: The metadata node allocates virtual address space to the client; the client may send the allocated virtual address space and the to-be-written data to the storage node, and a central processing unit (CPU) of the storage node determines, based on a mapping relationship between the virtual address space and a hard disk logical block address (LBA), a hard disk LBA corresponding to the received virtual address space, and sends the hard disk LBA and the to-be-written data to a to-be-written hard disk corresponding to the determined hard disk LBA; and the to-be-written hard disk determines, based on a mapping relationship between a hard disk LBA and a physical address, a physical address corresponding to the received hard disk LBA, and writes the to-be-written data to physical address space corresponding to the physical address.

In the foregoing data writing process, the CPU in the storage node further needs to determine the hard disk LBA corresponding to the virtual address space, to determine the to-be-written hard disk, and the to-be-written hard disk further needs to determine to-be-written physical address space based on the mapping relationship between a hard disk LBA and a physical address, and write the to-be-written data to the determined physical address space. Therefore, a data writing process of the storage node is relatively complex, a data writing delay is increased, and data writing efficiency is reduced.

SUMMARY

Embodiments of this application provide a storage system, a data processing method, an apparatus, a node, and a storage medium, so that data writing efficiency can be improved. The technical solutions are as follows.

According to a first aspect, a storage system is provided. The storage system includes a client and a storage node, and the storage node includes a first storage device; the client is configured to: determine, based on to-be-written data carried in a write request, an address that is in a storage unit and that is used to store the to-be-written data; and send the address in the storage unit and the to-be-written data to the first storage device corresponding to the storage unit; and the first storage device is configured to: store the to-be-written data to the first storage device; and establish a mapping relationship between the address in the storage unit and a physical address of the to-be-written data in the first storage device, where the address in the storage unit is not a logical block address (LBA).

In this method, the client determines the address that is in the storage unit and that is used to store the to-be-written data, and sends the to-be-written data to the first storage device that is in the storage node and that is corresponding to the storage unit, so that the first storage device stores the to-be-written data while a CPU of the storage node does not need to determine a hard disk LBA corresponding to virtual address space, and a hard disk does not need to determine a corresponding physical address based on the hard disk LBA. In this way, a data writing delay is reduced, and data writing efficiency is improved.

In a possible implementation, the storage system further includes a metadata node, and that the client determines, based on the to-be-written data carried in the write request, the address that is in the storage unit and that is used to store the to-be-written data includes: the client sends a data volume of the to-be-written data to the metadata node; and the metadata node is configured to: generate the address in the storage unit based on the data volume of the to-be-written data; and send the address in the storage unit to the client.

In a possible implementation, that the client is further configured to determine the first storage device based on the storage unit includes: the client determines a partition based on a correspondence between the storage unit and the partition, where the partition includes a plurality of storage devices; and the client queries the partition to determine the first storage device, where the first storage device is a storage device in the partition.

In a possible implementation, that the client sends the address in the storage unit and the to-be-written data to the first storage device corresponding to the storage unit includes: the client sends the address in the storage unit and the to-be-written data to a network interface card of the storage node; and the network interface card of the storage node is configured to: send the address in the storage unit and the to-be-written data to the first storage device.

Based on the foregoing possible implementations, the network interface card of the storage node directly sends the address in the storage unit and the to-be-written data that is carried in the write request to the first storage device, and the to-be-written data is sent to the first storage device without using the CPU. In this way, a processing resource of the CPU is reduced.

In a possible implementation, the storage system further includes a second storage device; and the second storage device is configured to: store the recovered to-be-written data to a physical address of the second storage device after the first storage device is faulty; and establish a mapping relationship between the address in the storage unit and the physical address of the second storage device.

In a possible implementation, the client is further configured to: determine, based on a system logical address carried in a read request, an address that is in the storage unit and that is corresponding to the system logical address; and send the address in the storage unit, a target data volume of target data carried in the read request, and a start offset of the target data in the storage unit to the first storage device corresponding to the storage unit; and the first storage device is further configured to: obtain the target data from the first storage device based on the address in the storage unit, the target data volume of the target data carried in the read request, and the start offset of the target data in the storage unit; and send the target data to the client.

In a possible implementation, the storage system further includes a metadata node, and that the client determines, based on the system logical address carried in the read request, the address that is in the storage unit and that is corresponding to the system logical address includes: the client sends the system logical address carried in the read request to the metadata node; and the metadata node is configured to: determine the address in the storage unit based on a correspondence between the system logical address and the storage unit; and send the address in the storage unit to the client.

In a possible implementation, that the first storage device obtains the target data from the first storage device based on the address in the storage unit, the target data volume of the target data carried in the read request, and the start offset of the target data in the storage unit includes: the first storage device determines, based on a mapping relationship between the address in the storage unit and a physical address, a target physical address corresponding to the address in the storage unit; and the first storage device reads the target data from the start offset in the target physical address based on the target data volume of the target data carried in the read request.

According to a second aspect, a data processing method in a storage system is provided. The storage system includes a client and a storage node, the storage node includes a first storage device, and the method includes: determining, by the client based on to-be-written data carried in a write request, an address that is in a storage unit and that is used to store the to-be-written data; sending, by the client, the address in the storage unit and the to-be-written data to the first storage device corresponding to the storage unit; storing, by the first storage device, the to-be-written data to the first storage device; and establishing, by the first storage device, a mapping relationship between the address in the storage unit and a physical address of the to-be-written data in the first storage device, where the address in the storage unit is not a logical block address (LBA).

In a possible implementation, the storage system further includes a metadata node, and that the client determines, based on the to-be-written data carried in the write request, the address that is in the storage unit and that is used to store the to-be-written data includes: the client sends a data volume of the to-be-written data to the metadata node; the metadata node generates the address in the storage unit based on the data volume of the to-be-written data; the metadata node sends the address in the storage unit to the client; and the client receives the address in the storage unit that is sent by the metadata node.

In a possible implementation, before the client sends the address in the storage unit and the to-be-written data to the first storage device corresponding to the storage unit, the method further includes: determining, by the client, a partition based on a correspondence between the storage unit and the partition, where the partition includes a plurality of storage devices; and querying, by the client, the partition to determine the first storage device, where the first storage device is a storage device in the partition.

In a possible implementation, that the client sends the address in the storage unit and the to-be-written data to the first storage device corresponding to the storage unit includes: the client sends the address in the storage unit and the to-be-written data to a network interface card of the storage node; and the network interface card of the storage node sends the address in the storage unit and the to-be-written data that is carried in the write request to the first storage device.

In a possible implementation, the storage system further includes a second storage device, and the method further includes: storing, by the second storage device, the recovered to-be-written data to a physical address of the second storage device after the first storage device is faulty; and establishing, by the second storage device, a mapping relationship between the address in the storage unit and the physical address of the second storage device.

In a possible implementation, the method further includes: determining, by the client based on a system logical address carried in a read request, an address that is in the storage unit and that is corresponding to the system logical address; sending, by the client, the address in the storage unit, a target data volume of target data carried in the read request, and a start offset of the target data in the storage unit to the first storage device corresponding to the storage unit; obtaining, by the first storage device, the target data from the first storage device based on the address in the storage unit, the target data volume of the target data carried in the read request, and the start offset of the target data in the storage unit; and sending, by the first storage device, the target data to the client.

In a possible implementation, the storage system further includes a metadata node, and that the client determines, based on the system logical address carried in the read request, the address that is in the storage unit and that is corresponding to the system logical address includes: the client sends the system logical address carried in the read request to the metadata node; and the metadata node is configured to: determine the address in the storage unit based on a correspondence between the system logical address and the storage unit; and send the address in the storage unit to the client.

In a possible implementation, that the first storage device obtains the target data from the first storage device based on the address in the storage unit, the target data volume of the target data carried in the read request, and the start offset of the target data in the storage unit includes: the first storage device determines, based on a mapping relationship between the address in the storage unit and a physical address, a target physical address corresponding to the address in the storage unit; and read data of the target data volume from the start offset in the target physical address to obtain the target data.

According to a third aspect, a data processing apparatus is provided. The apparatus includes: a determining module, configured to determine, based on to-be-written data carried in a write request, an address that is in a storage unit and that is used to store the to-be-written data; and a sending module, configured to send the address in the storage unit and the to-be-written data to a first storage device corresponding to the storage unit, where the address in the storage unit is not a logical block address (LBA), and the first storage device is included in a storage node.

Optionally, the determining module is configured to: send a data volume of the to-be-written data to a metadata node; and receive the address in the storage unit that is generated by the metadata node based on the data volume of the to-be-written data.

Optionally, the apparatus further includes: a first determining module, configured to determine a partition based on a correspondence between the storage unit and the partition, where the partition includes a plurality of storage devices; and a second determining module, configured to query the partition to determine the first storage device, where the first storage device is a storage device in the partition.

Optionally, the sending module is configured to: send the address in the storage unit and the to-be-written data to a network interface card of the storage node.

Optionally, the apparatus further includes a third determining module and a receiving module; the third determining module is configured to determine, based on a system logical address carried in a read request, an address that is in the storage unit and that is corresponding to the system logical address; the sending module is further configured to send the address in the storage unit, a target data volume of target data carried in the read request, and a start offset of the target data in the storage unit to the first storage device corresponding to the storage unit; and the receiving module is configured to receive the target data sent by the first storage device.

Optionally, the third determining module is configured to: send the system logical address carried in the read request to the metadata node; and receive the address that is in the storage unit and corresponding to the system logical address and that is sent by the metadata node.

According to a fourth aspect, a data processing apparatus is provided. The apparatus includes: a generation module, configured to generate an address in a storage unit based on a data volume of to-be-written data sent by a client, where the address in the storage unit is not a logical block address (LBA); and a sending module, configured to send the address in the storage unit to the client.

Optionally, the apparatus further includes: a receiving module, configured to receive a system logical address sent by the client; and a determining module, configured to determine, based on a mapping relationship between the system logical address and the address in the storage unit, a storage unit corresponding to the system logical address; and the sending module is further configured to send, to the client, the storage unit corresponding to the system logical address.

According to a fifth aspect, a data processing apparatus is provided. The apparatus includes: a receiving module, configured to receive an address in a storage unit and to-be-written data carried in a write request that are sent by a client; and a sending module, configured to send the address in the storage unit and the to-be-written data to a first storage device that is in the apparatus and that is corresponding to the storage unit.

Optionally, the apparatus further includes: a storage module, configured to store the recovered to-be-written data to a physical address of a second storage device after the first storage device is faulty; and an establishment module, configured to establish a mapping relationship between the address in the storage unit and the physical address of the second storage device.

Optionally, the apparatus further includes a determining module and a reading module; the receiving module is further configured to receive the address in the storage unit that is sent by the client, a target data volume of target data, and a start offset of the target data in the storage unit; the determining module is configured to determine, based on a mapping relationship between the address in the storage unit and a physical address, a target physical address corresponding to the address in the storage unit; the reading module is configured to read data of the target data volume from the start offset in the target physical address to obtain the target data; and the sending module is further configured to send the target data to the client.

According to a sixth aspect, a computing node is provided. The computing node includes a processor and a memory, the memory stores at least one instruction, and the instruction is loaded and executed by the processor to implement an operation performed by the client in the method provided in the second aspect or any optional manner in the second aspect.

According to a seventh aspect, a metadata node is provided. The metadata node includes a processor and a memory, the memory stores at least one instruction, and the instruction is loaded and executed by the processor to implement an operation performed by the metadata node in the method provided in the second aspect or any optional manner in the second aspect.

According to an eighth aspect, a storage node is provided. The storage node includes a processor and a memory, the memory stores at least one instruction, and the instruction is loaded and executed by the processor to implement an operation performed by the storage node in the method provided in the second aspect or any optional manner in the second aspect.

According to a ninth aspect, a computer-readable storage medium is provided. The storage medium stores at least one instruction, and the instruction is loaded and executed by a processor to implement an operation performed in the foregoing data processing method in the storage system.

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

Figure 1:
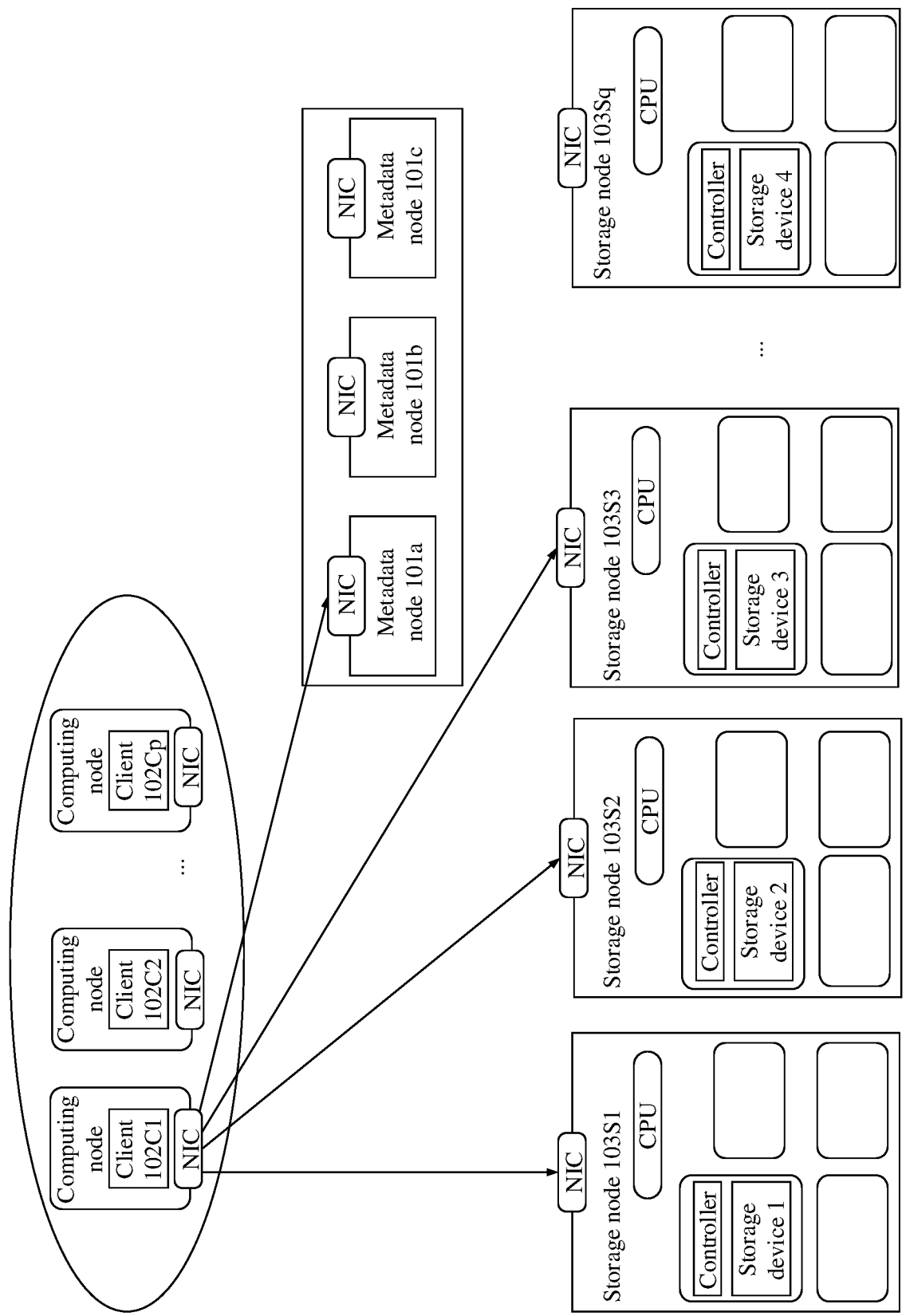
FIG. 1 is a schematic diagram of a storage system according to an embodiment of this application.

FIG. 1 is a schematic diagram of a storage system according to an embodiment of this application. As shown in FIG. 1, a storage system 100 may include at least one metadata node 101 (such as metadata nodes 101a, 101b, and 101c in FIG. 1), at least one client 102 (such as clients 102C1, 102C2, and 102Cp in FIG. 1, where p is greater than 2), and a plurality of storage nodes 103 (such as storage nodes 103S1, 103S2, 103S3, and 103Sq in FIG. 1, where q is greater than 3).

The at least one metadata node 101 is configured to manage a storage device in each storage node 103 in the storage system 100. When the storage system 100 includes a plurality of metadata nodes 101, each metadata node 101 is configured to manage some storage devices in the storage system 100. In an initialization process of the storage system 100, the metadata node 101 is configured to divide storage devices managed by the metadata node 101, to obtain a plurality of partitions. Each partition may include a plurality of storage devices, and the plurality of storage devices may be located on different storage nodes 103, or may be located on a same storage node 103. The storage device may be a solid-state disk, a mechanical disk, or a storage device of another type of storage medium. This is not limited in this embodiment of the present invention. The metadata node 101 is further configured to establish a mapping relationship between each partition and a storage device in each partition. Each partition is indicated by a partition identifier, each storage device is indicated by a device identifier, partition identifiers of different partitions are different, and device identifiers of different storage devices are different. The metadata node 101 may further notify each client 102 of a storage device included in each partition, so that when subsequently writing data to a partition, the client 102 may know a storage device to which the to-be-written data is to be written. A quantity of storage devices in each partition may be determined by a redundancy coding scheme of the storage system 100. If the redundancy coding scheme used by the storage system 100 is K-copy coding, to be specific, K copies of to-be-written data are written to one partition, the K copies may be separately written to K storage devices in the partition. In this case, a quantity of storage devices in the partition is K, and K is an integer greater than 1. If the redundancy coding scheme used by the storage system 100 is erasure coding (EC), to be specific, the to-be-written data is embodied by N data blocks and M check blocks, the N data blocks and the M check blocks of the to-be-written data may be separately written to corresponding storage devices in the partition. In this case, a quantity of storage devices in each partition is N+M, and both N and M are integers greater than 1.

In a data writing process, the metadata node 101 is further configured to: allocate a storage unit to the client 102, establish a mapping relationship between the allocated storage unit and a partition, and send the mapping relationship to the client 102, so that the client 102 writes the to-be-written data to each storage device in a partition corresponding to the storage unit. One partition may correspond to at least one storage unit, and storage space of each storage unit is provided by a storage device in the partition. The metadata node 101 is further configured to store an offset of the storage unit, and the offset is used to indicate a location that is stored in the storage unit and at which data has been stored. After the to-be-written data is written, the metadata node 101 may further update the offset of the storage unit. A maximum offset of the storage unit is not specifically limited in this embodiment of this application.

One storage unit is a logical basic management unit when data of a target data type is stored. For example, the data of the target data type may be any one of a file, an object, a block, a stream, or the like. The storage unit may correspond to one partition, and the storage unit may be mapped from physical address space of each storage device in the corresponding partition. For example, if a storage unit 1 of 20 M corresponds to a partition A, and the partition A includes storage devices A1 and A2, physical address space A11 of 20 M in the storage device A1 may be mapped to the storage unit 1, and physical address space A22 of 20 M in the storage device A2 may also be mapped to the storage unit 1. It should be noted that, when any storage unit is allocated to the client 102 for a first time, the metadata node 101 is further configured to establish a mapping relationship between the storage unit and a system logical address, where an address in the storage unit corresponds to one system logical address, and in this case, an offset of the storage unit is 0, to indicate that the storage unit stores no data. Subsequently, each time data is written to physical address space that is in a storage device and that is in a mapping relationship with the storage unit, the metadata node 101 may update the offset of the storage unit once, to indicate a data volume of data currently stored in the storage unit. The address in the storage unit is used to uniquely indicate the storage unit, and the address in the storage unit is not an LBA, and may be an identity (ID) of the storage unit, for example, an object identity Object ID. The system logical address is a storage address that is provided by the storage system outwards, for example, a storage address used by the client. The storage device is configured to provide "append".

In a data reading process, the metadata node 101 is further configured to: receive a query request sent by the client 102, and send, to the client 102 based on a system logical address carried in the query request, an address in a storage unit corresponding to the logical address, so that the client 102 reads data stored in the storage unit.

In a data reconstruction process, the metadata node 101 is further configured to determine whether a storage device managed by the metadata node 101 is faulty. If a first storage device in any partition managed by the metadata node 101 is faulty, the metadata node 101 may replace the first storage device with a second storage device, and send a data reconstruction instruction to a storage node 103 on which a primary storage device in the partition is located, to instruct the storage node 103 to recover data in the first storage device and store the recovered data to the second storage device. The first storage device is any storage device in the partition, and the second storage device is any unfaulty storage device outside the partition.

Each client 102 is configured to provide a data writing service and a data reading service for a user. In other words, the client 102 may write, to the storage node 103, data uploaded by the user, or may read data from the storage node 103. Before writing the data, the client 102 may first request the metadata node 101 to allocate a storage unit, determine, as a to-be-written partition, a partition corresponding to the storage unit allocated by the metadata node 101, and store the data based on the to-be-written data and a redundancy coding scheme of the storage system 100. When the redundancy coding scheme is K-copy coding, K copies of the to-be-written data are generated and are separately written to K corresponding storage devices in the partition. When the redundancy coding scheme is EC coding, each piece of first data is one data block of the to-be-written data. For any piece of first data, the client may send a target write request to a storage node 103 on which a storage device in the partition is located, to indicate the storage node 103 to write the first data to the storage device. Before reading data, the client 102 may first request the metadata node 101 to query a to-be-read storage unit. After the to-be-read storage unit is found from the metadata node 101, a read request is sent to a storage node 103 on which a storage device in a partition corresponding to the to-be-read storage unit is located, to request to read the data.

Figure 2:
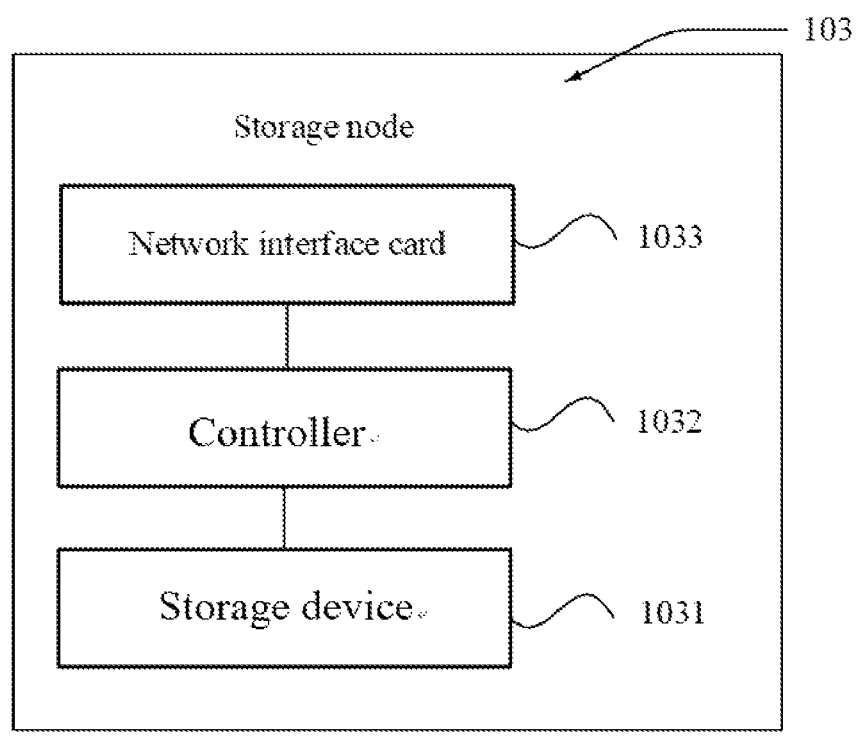
FIG. 2 is a schematic diagram of a structure of a storage node according to an embodiment of this application.

FIG. 2 is a schematic diagram of a structure of a storage node according to an embodiment of this application. The storage node 103 may vary greatly based on different configuration or performance, and may include one or more storage devices 1031 and at least one controller 1032. The controller 1032 is configured to implement steps performed by a storage node in methods provided in the following method embodiments. Certainly, the storage node 103 may further include another component configured to implement a device function, and details are not described herein.

Each storage device 1031 corresponds to one controller 1032, and a controller 1032 corresponding to a storage device 1031 may be located inside the storage device 1031, or may be located outside the storage device 1031. This embodiment of this application is described by using an example in which the controller 1032 is located outside the storage device 1031. Each storage device 1031 corresponds to one physical address range. The physical address range may include a plurality of physical addresses. Each physical address corresponds to one physical address space in the storage device. Sizes of physical address space corresponding to the plurality of physical addresses may be different or may be the same. At least one physical address space may be mapped to one storage unit. In a possible implementation, the storage node 103 may further include a network interface card 1033. The network interface card 1033 may be a network interface controller (NIC), for example, the NIC in FIG. 1. The network interface card 1033 is configured to: receive a target write request sent by the client 102, and forward, based on a to-be-written storage device 1031 indicated by the target write request, the target write request to a controller 1032 corresponding to the to-be-written storage device 1031, and the controller 1032 writes first data to the to-be-written storage device 1031. Alternatively, the network interface card 1033 is configured to forward, to each controller 1032 in the storage node, the target write request sent by the client 102. After any controller 1032 receives the target write request, if the storage device 1031 indicated by the target write request is the same as a storage device 1031 corresponding to the controller 1032, the controller 1032 writes first data carried in the target write request to the storage device 1031. Otherwise, the controller ignores the target write request. After completing writing, the controller 1032 is further configured to establish, based on an address in the storage unit that is carried in the write request, a mapping relationship between the storage unit and physical address space for storing the to-be-written data. The controller 1032 is further configured to update an offset of the storage unit based on a data volume of the to-be-written data. The network interface card 1033 is further configured to: receive a target read request sent by the client 102, and forward, based on a to-be-read storage device 1031 indicated by the target read request, the target read request to a controller 1032 corresponding to the to-be-read storage device 1031. The controller 1032 determines, based on an address of a to-be-read storage unit that is carried in the target read request, a physical address corresponding to the to-be-read storage unit, and return, to the client 102, to-be-read data stored in physical address space corresponding to the physical address. The controller 1032 may be an intelligent chip. A form of the controller 1032 is not specifically limited in this embodiment of this application. In another implementation, a function of the controller 1032 may be implemented by a controller of the storage device 1031.

It should be noted that the storage node 103 further includes at least one CPU, and the CPU is configured to perform another operation. A plurality of storage devices included in any partition may be further classified into one primary storage device and at least one secondary storage device. The primary storage device is any storage device in the partition. For example, a first storage device in the partition is the primary storage device, and a storage device in the partition other than the primary storage device is the secondary storage device. A controller corresponding to the primary storage device is further configured to store a mapping relationship that is between physical address space and virtual address space of data and that is stored in each secondary storage device. After receiving a data reconstruction instruction sent by the metadata node 101, the controller is further configured to: recover, based on data stored in an unfaulty storage device in the partition, data stored in a faulty storage device in the partition, store the recovered data in the unfaulty storage device, and modify, based on physical address space that is in the unfaulty storage device and that is used to store reconstructed data, a mapping relationship between a physical address that is in the faulty storage device and that stores data and the storage unit into a mapping relationship between the physical address space that is in the unfaulty storage device and that is used to store the reconstructed data and the storage unit, so that the faulty storage device in the partition is replaced with the unfaulty storage device. The reconstructed data is recovered data stored in the faulty storage device, and is recovered data. In another implementation, the storage devices in the partition may not include the primary storage device, and the client implements a function of the primary storage device. For example, the client writes data to or reads data from the storage device in the partition in a redundancy coding scheme, and the client reconstructs the data.

It should be noted that the metadata node 101 may also include a network interface card, and the metadata node 101 may be a server or the like. The client 102 may be mounted on a computing node, and the computing node may also include a network interface card. The computing node may be a server, an array controller of a storage array, or the like, or may be a storage node that runs a client program and that is provided in a distributed storage system. The storage node 103 may be a storage node in the distributed storage system, or may be a hard disk frame in the storage array, or the like. A specific form of each component in the storage system is not limited in the present invention.

Figure 3:
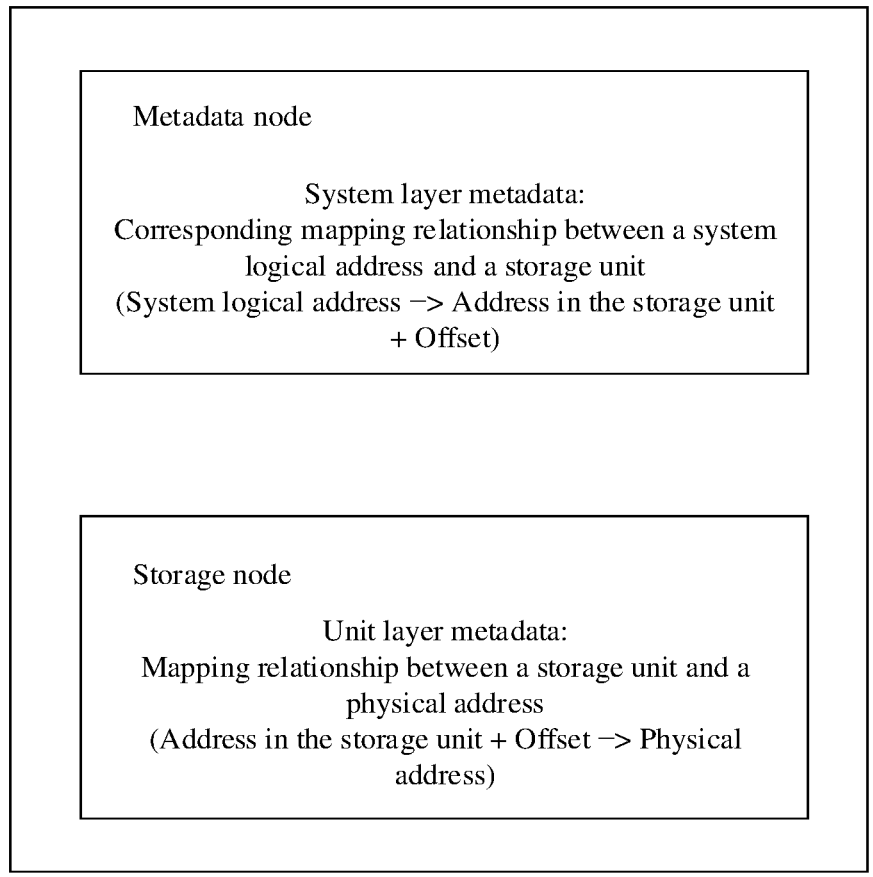
FIG. 3 is a schematic diagram of metadata distribution according to an embodiment of this application.

It should be noted that metadata in the storage system 100 may be divided into two layers: system layer metadata and unit layer metadata. The system layer metadata is used to indicate a mapping relationship between a system logical address and a storage unit and is stored on the metadata node 101, and the unit layer metadata is used to indicate a mapping relationship between a storage unit and a physical address and is stored on the storage node 103. For example, FIG. 3 is a schematic diagram of metadata distribution according to an embodiment of this application. The system layer metadata is stored on the metadata node, and the unit layer metadata is stored on the storage node.

Figure 4:
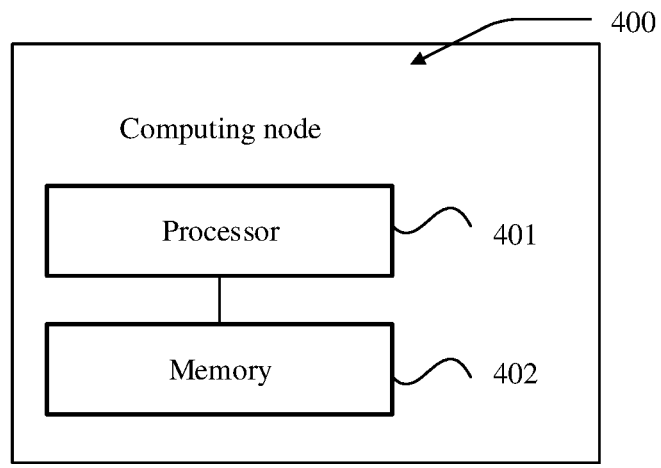
FIG. 4 is a schematic diagram of a structure of a computing node according to an embodiment of this application.

FIG. 4 is a schematic diagram of a structure of a computing node according to an embodiment of this application. A computing node 400 may include a processor 401 and a memory 402. The processor 401 may be a CPU, and the processor 401 may alternatively be implemented by a digital signal processor (DSP), a field-programmable gate array (FPGA), or the like. The processor 401 may also include a main processor and a coprocessor. In some embodiments, the processor 401 may further include an artificial intelligence (AI) processor, and the AI processor is configured to process a computing operation related to machine learning.

The memory 402 may include one or more computer-readable storage media, where the computer-readable storage media may be in a non-transient state. The memory 402 may further include a high-speed random access memory and a non-volatile memory, for example, one or more magnetic disk storage devices or flash memory storage devices. In some embodiments, a non-transient computer-readable storage medium in the memory 402 is configured to store at least one instruction, and the at least one instruction is used by the processor 401 to implement steps performed by a client in methods provided in the following embodiments of this application. Certainly, the computing node 400 may further have components such as a network interface card, a keyboard, and an input/output interface, to perform input/output. The computing node 400 may further include another component used to implement a device function, and details are not described herein.

Figure 5:
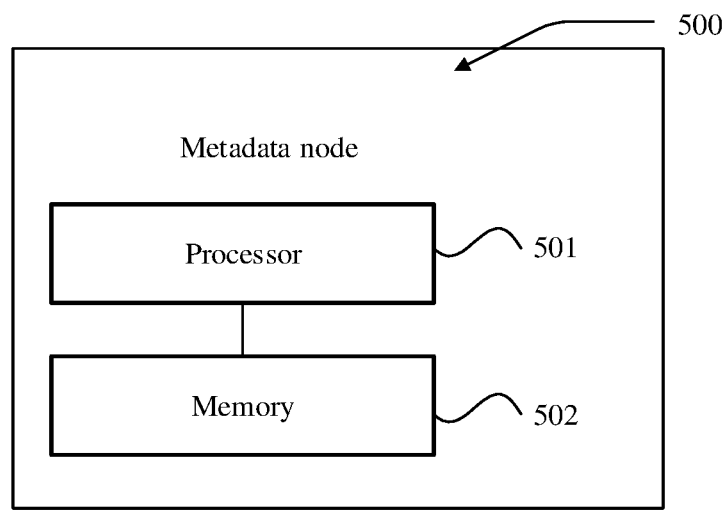
FIG. 5 is a schematic diagram of a structure of a metadata node according to an embodiment of this application.

FIG. 5 is a schematic diagram of a structure of a metadata node according to an embodiment of this application. A metadata node 500 may vary greatly due to different configuration or performance, and may include one or more memories 501 and at least one processor 502. The memory 501 stores at least one instruction, and the at least one instruction is loaded and executed by the processor 502 to implement steps performed by a metadata node in methods provided in the following method embodiments. Certainly, the metadata node 500 may further have a network interface card, to perform input/output. The metadata node 500 may further include another component used to implement a device function, and details are not described herein.

In an example embodiment, a computer-readable storage medium is further provided, such as a memory or a storage device including an instruction. The instruction may be executed by a processor in a terminal to complete methods provided in the following embodiments. For example, the computer-readable storage medium may be a ROM, a RAM, a CD-ROM, a magnetic tape, a floppy disk, or an optical data storage node.

Figure 6A:
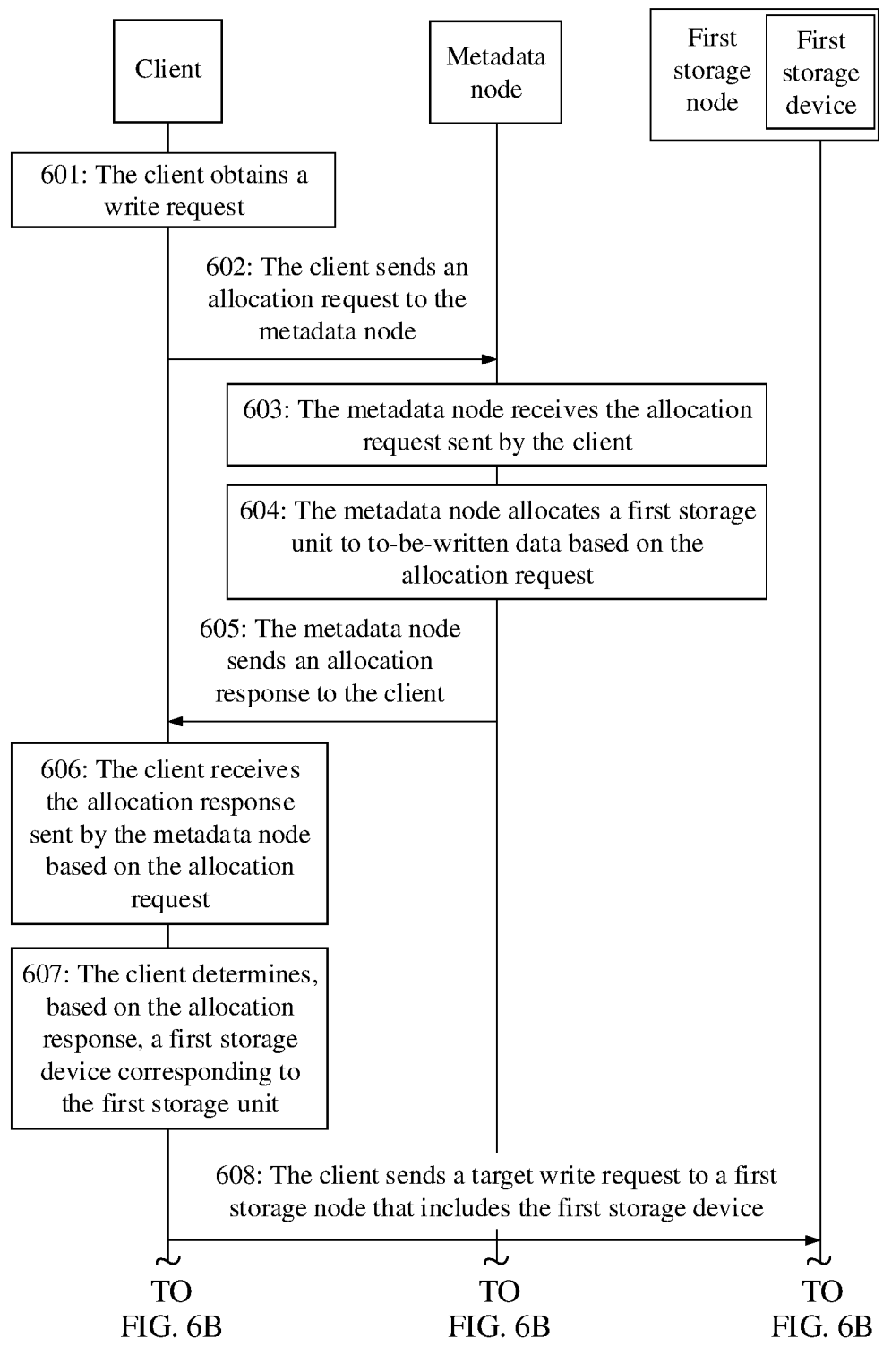
FIG. 6A and FIG. 6B are a flowchart of a data processing method in a storage system according to an embodiment of this application.
Figure 6B:
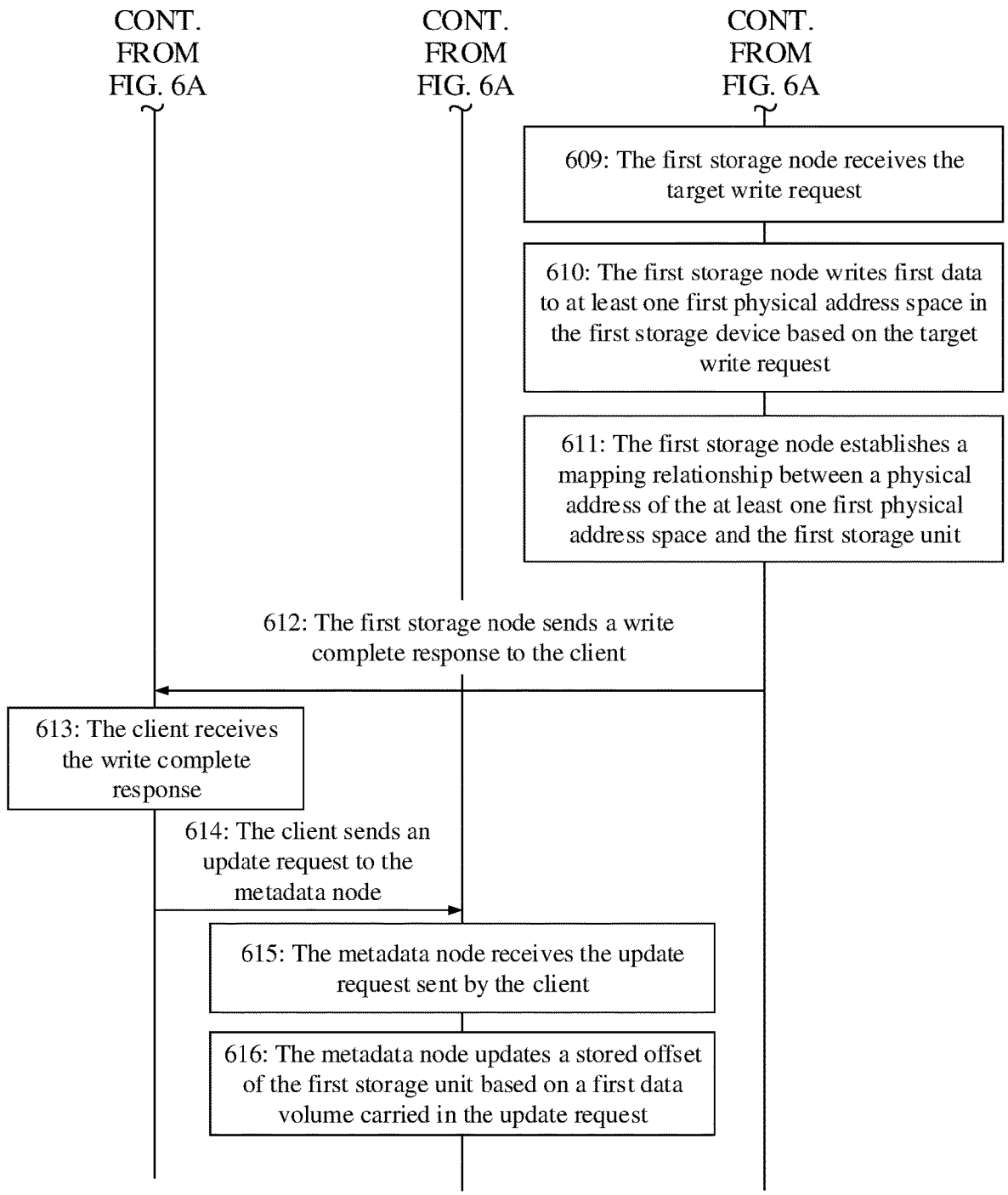

A client may request a metadata node to allocate a to-be-written storage unit, and write, based on a mapping relationship between the allocated storage unit and a partition, to-be-written data to each storage device in a partition corresponding to the storage unit. A storage node on which each storage device is located may update a physical address corresponding to the storage unit. For further descriptions of the process, refer to a flowchart of a data processing method in a storage system according to an embodiment of this application shown in FIG. 6A and FIG. 6B. The storage system includes a client, a storage node, and a metadata node.

601: The client obtains a write request, where the write request carries to-be-written data.

The client may be any client in the storage system, the write request is used to indicate the client to write the to-be-written data to the storage system, and the write request may include the to-be-written data. The client may receive the write request triggered by a user operation, to obtain the write request.

After obtaining the write request, the client may obtain a plurality of pieces of first data based on a redundancy coding scheme of the storage system and the to-be-written data. A data volume of each piece of first data is equal to a data volume of the to-be-written data. In a possible implementation, when the redundancy coding scheme of the storage system is K-copy coding, the client may make K copies of the to-be-written data to obtain the K copies of the to-be-written data, and each copy is one piece of first data. When the redundancy coding scheme of the storage system is EC coding, the client may perform EC coding on the to-be-written data to obtain N data blocks and M check blocks of the to-be-written data, and each data block or each check block is one piece of first data.

After the client obtains the plurality of pieces of first data, the client may first determine a storage unit configured to store the to-be-written data, and then separately store each piece of first data to one storage device in a partition corresponding to the storage unit. A process in which the client determines the to-be-written storage unit may be implemented in the following steps 602 to 606, and a process in which the client writes each piece of first data to one storage device in the partition corresponding to the storage unit may be implemented in the following steps 607 to 613.

602: The client sends an allocation request to the metadata node, where the allocation request is used to indicate the metadata node to allocate a to-be-written storage unit to the to-be-written data.

The metadata node may be any metadata node in the storage system; or a storage device managed by the metadata node may have a large amount of physical address space that does not store data; in other words, load of the storage device managed by the metadata node is relatively small. The allocation request may include a data volume of the to-be-written data and an allocation identifier, and the allocation identifier is used to indicate the metadata node to allocate the to-be-written storage unit to the to-be-written data. A process shown by step 602 is also a process in which the client sends the data volume of the to-be-written data to the metadata node. For ease of description, the data volume of the to-be-written data may be denoted as a first data volume.

603: The metadata node receives the allocation request sent by the client.

604: The metadata node allocates a first storage unit to the to-be-written data based on the allocation request.

The first storage unit is a storage unit that is allocated by the metadata node and that is used to store the to-be-written data, and a sum of an offset of the first storage unit and the data volume of the to-be-written data is less than or equal to a maximum offset of the first storage unit.

The metadata node may allocate the to-be-written storage unit to the to-be-written data based on the first data volume in the allocation request. In a possible implementation, the metadata node may first determine a plurality of allocated storage units, and obtain offsets of the plurality of allocated storage units. The metadata node may determine the first storage unit based on the offsets of the plurality of allocated storage units and the first data volume in the allocation request. The allocated storage unit is a storage unit that has been allocated, and the offsets of all the allocated storage units are greater than 0, in other words, data is stored in all the allocated storage units.

A process in which the metadata node may determine the first storage unit based on the offsets of the plurality of allocated storage units and the first data volume in the allocation request may be: When a sum of an offset of any allocated storage unit and the first data volume is less than or equal to a maximum offset of the allocated storage unit, the metadata node may use the allocated storage unit as the first storage unit. When a sum of an offset of each allocated storage unit and the first data volume is greater than a maximum offset of each allocated storage unit, and each allocated storage unit cannot be used as the first storage unit, the metadata node may allocate a new storage unit to the client, and use the new storage unit as the first storage unit. In a possible implementation, the metadata node may generate an address in the first storage unit based on the data volume of the to-be-written data. In this case, the first storage unit is also a new storage unit.

After the metadata node determines the first storage unit allocated to the to-be-written data, the metadata node may further determine a partition and a storage device that are corresponding to the first storage unit. For ease of description, the partition corresponding to the first storage unit is denoted as a first partition, and the storage device corresponding to the first storage unit is denoted as a first storage device. The first storage device is a storage device in the first partition.

A process in which the metadata node determines the first partition may be: When the first storage unit is an allocated storage unit, the metadata node may determine, based on a stored mapping relationship between a storage unit and a partition, the first partition corresponding to the first storage unit; and when the first storage unit is a new storage unit, the metadata node may select a partition from a plurality of partitions managed by the metadata node as the first partition, and establish a mapping relationship between the first storage unit and the first partition, so that the first storage unit corresponds to the first partition. The mapping relationship between the first storage unit and the first partition may include: An address in the first storage unit corresponds to a partition identifier of the first partition; in other words, the address in the first storage unit and the first partition is in a mapping relationship.

During initialization, the metadata node stores a mapping relationship between each partition and a storage device included in the partition. Therefore, a process in which the metadata node determines the storage device corresponding to the first storage unit may be: The metadata node may determine, based on a mapping relationship between the first partition and a storage device, a storage device included in the first partition, and use each storage device included in the first partition as the first storage device. A mapping relationship between a partition and a storage device included in the partition may include a partition identifier of the partition and a device identifier of each storage device included in the partition. For example, a partition B includes four storage devices 001 to 004, where B is a partition identifier, and 001 to 004 are device identifiers.

605: The metadata node sends an allocation response to the client, where the allocation response is used to indicate the first storage unit allocated by the metadata node to the to-be-written data.

The allocation response may include the partition identifier of the first partition and the address in the first storage unit, to indicate to allocate the first storage unit to the to-be-written data. The allocation response may further include a device identifier of each storage device in the first partition.

It should be noted that, because the allocation response includes the address in the first storage unit, a process shown by step 605 is also a process in which the metadata node sends the address in the storage unit to the client. A process shown by steps 602 to 605 is also a process in which the client determines, based on the to-be-written data carried in the write request, an address that is in the storage unit and that is used to store the to-be-written data.

606: The client receives the allocation response sent by the metadata node based on the allocation request.

The allocation response carries the address that is in the first storage unit and that is allocated by the metadata node. Therefore, a process shown by step 606 is also a process in which the client receives the address that is in the storage unit and that is sent by the metadata node and used to store the to-be-written data.

It should be noted that each time the client requests the metadata node to allocate a to-be-written storage unit, the metadata node allocates a storage unit and a partition corresponding to the storage unit. Each device in the partition corresponding to the storage unit may store one piece of first data of the to-be-written data. Therefore, for the to-be-written data, the client only needs to request the metadata node to allocate a to-be-written storage device once, and does not need to request to perform allocation once for each piece of first data. In other words, before the to-be-written data is written to a first partition, the process shown by steps 602 to 606 needs to be performed only once.

607: The client determines, based on the allocation response, a first storage device corresponding to the first storage unit.

When the allocation response does not include a device identifier but includes a partition identifier, the client may determine, based on the partition identifier in the allocation response, that a to-be-written partition is the first partition. During initialization, the metadata node has notified the client of a storage device in each partition. Therefore, after determining that the to-be-written partition is the first partition, the client may use each storage device in the first partition as one first storage device.

When the allocation response includes a device identifier, the client may use, as one first storage device, a storage device indicated by each device identifier in the allocation response.

The client may separately write each piece of first data of the to-be-written data to one storage device in the first partition. A process of storing one piece of first data to the first storage device in the first partition may include the following steps 608 to 613.

608: The client sends a target write request to a first storage node that includes the first storage device, where the target write request is used to indicate the first storage node to write the first data to the first storage device.

The target write request includes the first data, a device identifier of the first storage device, the address in the first storage unit, and the offset of the first storage unit, and the offset is used to indicate a location that is stored in the storage unit and at which data has been stored. The target write request may further include a write identifier, and the write identifier is used to indicate the first storage node to write the first data to the first storage device.

When the storage system is initialized, in addition to sending a partition identifier of a partition managed by the metadata node and a device identifier of a storage device included in each partition to each client in the storage system, the metadata node may further send address information of a storage node on which the storage device included in each partition is located to each client in the storage system, and each client stores the address information of the storage node on which the storage device included in each partition is located. Before the client writes the first data to the first storage device, the client may first obtain stored address information of the first storage node on which the first storage device is located, and then send the target write request to the first storage node based on the address information of the first storage node.

In a possible implementation, the client may further send the target write request to a network interface card of the first storage node, and the network interface card of the first storage node sends the target write request to the first storage device. Because the target write request includes the first data and the address in the first storage unit, a process in which the client sends the target write request to the network interface card of the first storage node and the network interface card of the first storage node sends the target write request to the first storage device is also a process in which the client sends, to the network interface card of the first storage node, the address that is in the storage unit and that is used to store the to-be-written data and the to-be-written data carried in the write request, and the network interface card of the first storage node sends, to the first storage device, the address in the storage unit and the to-be-written data carried in the write request, and is also a process in which the client sends, to the first storage device corresponding to the storage unit that stores the to-be-written data, the address in the storage unit and the to-be-written data carried in the write request.

609: The first storage node receives the target write request.

A process shown by step 609 may be performed by the network interface card on the first storage node. After the network interface card receives the target write request sent by the client, the network interface card may further determine, based on the device identifier carried in the target write request, that a to-be-written storage device is the first storage device, and forward the target write request to a controller corresponding to the first storage device, and the controller writes the first data to the first storage device based on the write request. Because the target write request includes the first data and the address in the first storage unit, when the controller of the first storage device is located in the first storage device, a process in which the network interface card sends the target request to the controller of the first storage device is also a process in which the network interface card of the first storage node sends the address in the first storage unit and the to-be-written data that is carried in the write request to the first storage device.

610: The first storage node writes the first data to at least one first physical address space in the first storage device based on the target write request.

A total size of the at least one first physical address space is greater than or equal to the data volume of the first data. The at least one first physical address space may be adjacent physical address space in the first storage device, or may be non-adjacent physical address space in the first storage device. A location of the at least one first physical address space in the first storage device is not specifically limited in this embodiment of this application.

It should be noted that a process shown by step 610 is also a process in which the first storage node writes the first data to the first physical address space in the first storage device based on the target write request. Step 610 may alternatively be implemented by the controller corresponding to the first storage device. After receiving the target write request sent by the network interface card, the controller may obtain the first data from the target write request, and write the first data to the at least one first physical address space. When the controller is located in the first storage device, the process shown by step 610 is also a process in which the first storage device stores the to-be-written data to the first storage device.

611: The first storage node establishes a mapping relationship between a physical address of the at least one first physical address space and the first storage unit.

Step 611 may be performed by the controller corresponding to the first storage device. The controller may obtain the address in the first storage unit from the target write request, and establish the mapping relationship between the physical address of the at least one first physical address space and the first storage unit based on the address in the first storage unit.

In a possible implementation, for any first physical address space in the at least one first physical address space, the controller may establish a mapping relationship between a physical address of the first physical address space and the address in the first storage unit, so that the first physical address space may be mapped to the first storage unit. In this case, writing data to the first physical address space is also writing data to the first storage unit.

After a mapping relationship between the at least one first physical address space and the first storage unit is established, the controller may further store the mapping relationship between the at least one first physical address space and the first storage unit, so that the controller may subsequently read data from the first storage unit.

It should be noted that the at least one physical address space is also physical address space that is in the first storage device and that is used to store the first data, and the physical address of the at least one physical address space is also a physical address of the to-be-written data in the first storage device. When the controller is located in the first storage device, a process shown by step 611 is also a process in which the first storage device establishes a mapping relationship between the address in the first storage unit and the physical address of the to-be-written data in the first storage device.

After the first storage node completes step 611, the first storage node may further update the stored offset of the first storage unit based on the first data volume of the first data. A process in which the first storage node updates the offset of the first storage unit may alternatively be performed by the controller corresponding to the first storage device. The controller stores an offset of each storage unit corresponding to the first storage device. If the first storage unit is an allocated storage unit, the controller may update the stored offset of the first storage unit based on the first data volume of the first data and the stored offset of the first storage unit. The updated offset of the first storage unit is equal to a sum of the first data volume and the stored offset of the first storage unit, and the updated offset of the first storage unit is a current latest offset of the first storage unit. If the first storage unit is a new storage unit corresponding to the first storage device, the controller may store the offset of the first storage unit based on the first data volume of the first data, and the stored offset of the first storage unit is the first data volume. In this case, the stored offset of the first storage unit is a current latest offset of the first storage unit.

> 612: The first storage node sends a write complete response to the client, where the write complete response is used to indicate that the first data has been written.

Step 612 may be performed by the controller corresponding to the first storage device. After the controller writes the first data to the first storage device, the controller may send the write complete response to the network interface card in the first storage node, and the network interface card forwards the write complete response to the client.

> 613: The client receives the write complete response.

After the client receives the write complete response, it indicates that the first data has been written to the first storage device in this case.

Figure 7:
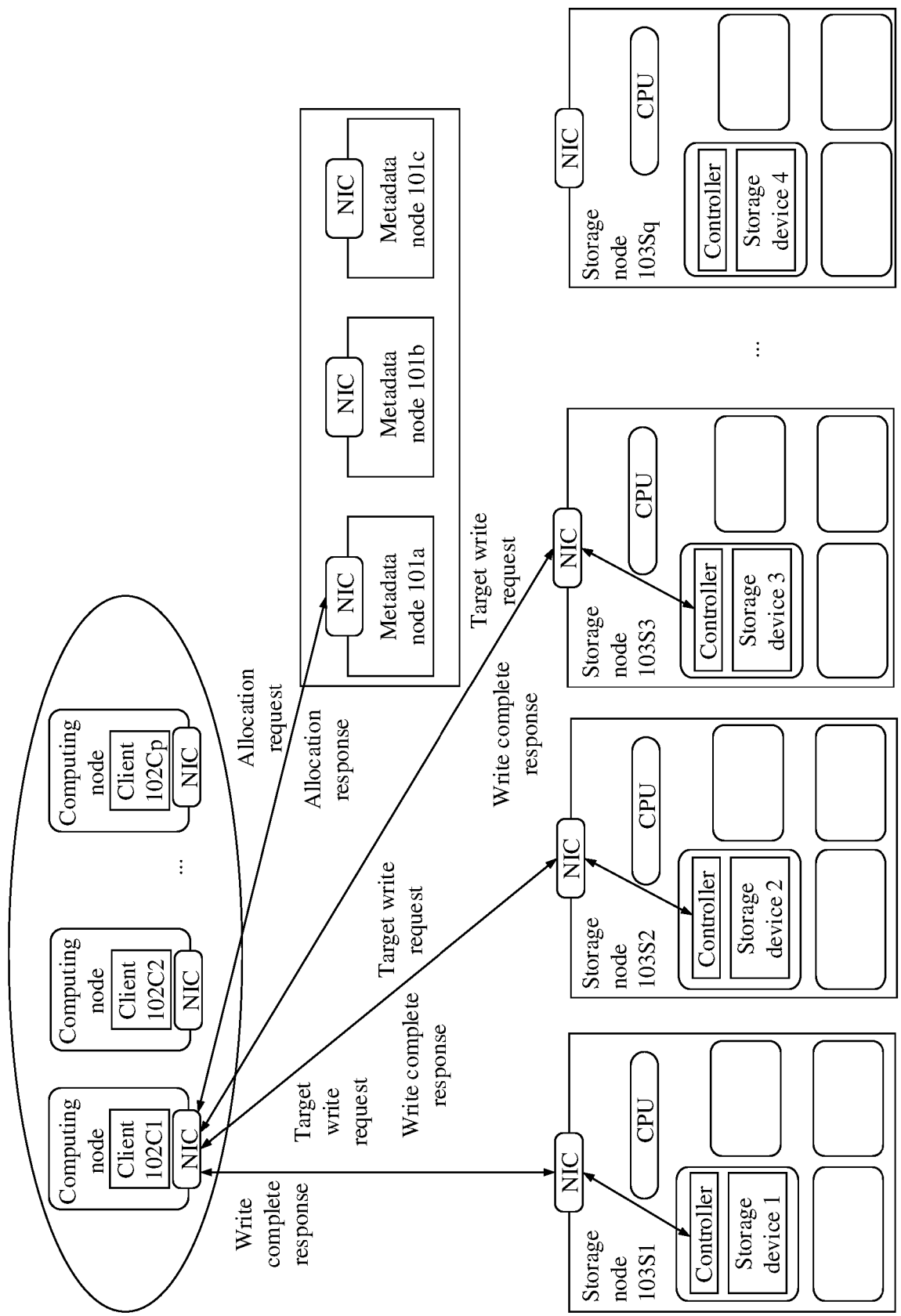
FIG. 7 is a schematic diagram of data writing in a storage system according to an embodiment of this application.

It should be noted that, based on a redundancy coding scheme of the storage system, after the client writes all a plurality of pieces of first data corresponding to the to-be-written data to the first partition, the to-be-written data is written, and for each piece of first data, the storage system needs to perform a process of steps 608 to 613 once. For further descriptions of a process in which the client writes the to-be-written data to the first partition, refer to a schematic diagram of data writing in the storage system according to an embodiment of this application shown in FIG. 7. In FIG. 7, for example, the client is 102C1, the network interface card is an NIC, the client 102C1 sends an allocation request to a metadata node 101a, the metadata node 101a returns an allocation response to the client based on the allocation request, and the client 102C1 may determine, based on the received allocation response, a first storage unit allocated by the metadata node 101a and a first partition corresponding to the first storage unit. The first partition may include a storage device 1 in a storage node 103S1, a storage device 2 in a storage node 103S2, and a storage device 3 in a storage node 103S3. The client 102C1 separately sends a target write request to the storage node 103S1, the storage node 103S2, and the storage node 103S3 in a redundancy coding mode of the storage system. Controllers of the storage device 1, the storage device 2, and the storage device 3 separately write first data carried in the received target write request to the storage device 1, the storage device 2, and the storage device 3. After writing is completed, the storage node 103S1, the storage node 103S2, and the storage node 103S3 each send a write complete response to the client 102C1. After the client 102C1 receives the write complete responses sent by the storage node 103S1, the storage node 103S2, and the storage node 103S3, the to-be-written data is stored.

> 614: The client sends an update request to the metadata node, where the update request is used to indicate the metadata node to update the stored offset of the first storage unit based on the data volume of the to-be-written data, and the offset is used to indicate a location that is stored in the storage unit and at which data has been stored.

The update request may include the first data volume of the to-be-written data and the address in the first storage unit. The update request may further include an update identifier, and the update identifier is used to indicate the metadata node to update the stored offset of the first storage unit based on the first data volume of the to-be-written data.

It should be noted that the data volume of the to-be-written data and a data volume of each piece of first data of the to-be-written data are the first data volume. Therefore, when each piece of first data of the to-be-written data is separately written to each storage device in the first partition, a data volume of newly added data in each storage device is the first data volume, and a data volume of newly added data in a first storage unit corresponding to first physical address space that stores each piece of first data is also the first data volume. In a possible implementation, the client may send the update request to the metadata node after the to-be-written data is written.

In a possible implementation, after storing the plurality of pieces of to-be-written data, the client sends a target update request to the metadata node. The target update request may include a data volume of the plurality of pieces of to-be-written data and an address that is in the storage unit and that is allocated by the metadata node to each piece of to-be-written data, the target update request may further include a target request identifier, and the target request identifier is used to indicate the metadata node to update, based on each data volume in the target update request, an offset that is of the storage unit and that is corresponding to each data volume. Because the client sends one target update request to the metadata node only after writing the plurality of pieces of to-be-written data, a quantity of times of interaction between the client and the metadata node can be reduced.

> 615: The metadata node receives the update request sent by the client.
>
> 616: The metadata node updates the stored offset of the first storage unit based on the first data volume carried in the update request.

An offset of each storage unit corresponding to each storage device is stored in the metadata node. A process in which the metadata node updates the stored offset of the first storage unit based on the data volume of the to-be-written data is the same as a process in which the controller updates the stored offset of the first storage unit based on the first data volume in step 611. Herein, the process in which the metadata node updates the stored offset of the first storage unit based on the data volume of the to-be-written data is not described in this embodiment of this application.

In the method provided in this embodiment of this application, the client determines the address that is in the storage unit and that is used to store the to-be-written data, and sends the to-be-written data to the first storage device that is in the storage node and that is corresponding to the storage unit, so that the first storage device stores the to-be-written data while a CPU of the storage node does not need to determine a hard disk LBA corresponding to virtual address space and a hard disk does not need to determine a corresponding physical address based on the hard disk LBA. In this way, a data writing delay is reduced, and data writing efficiency is improved. In addition, after storing the plurality of pieces of to-be-written data, the client sends one target update request to the metadata node, so that the quantity of times of interaction between the client and the metadata node can be reduced. In addition, a data writing process is performed by a controller corresponding to the to-be-written storage unit in the storage node, and does not need to be performed by the CPU of the storage node, so that CPU overheads in the storage node are reduced.

Figure 8A:
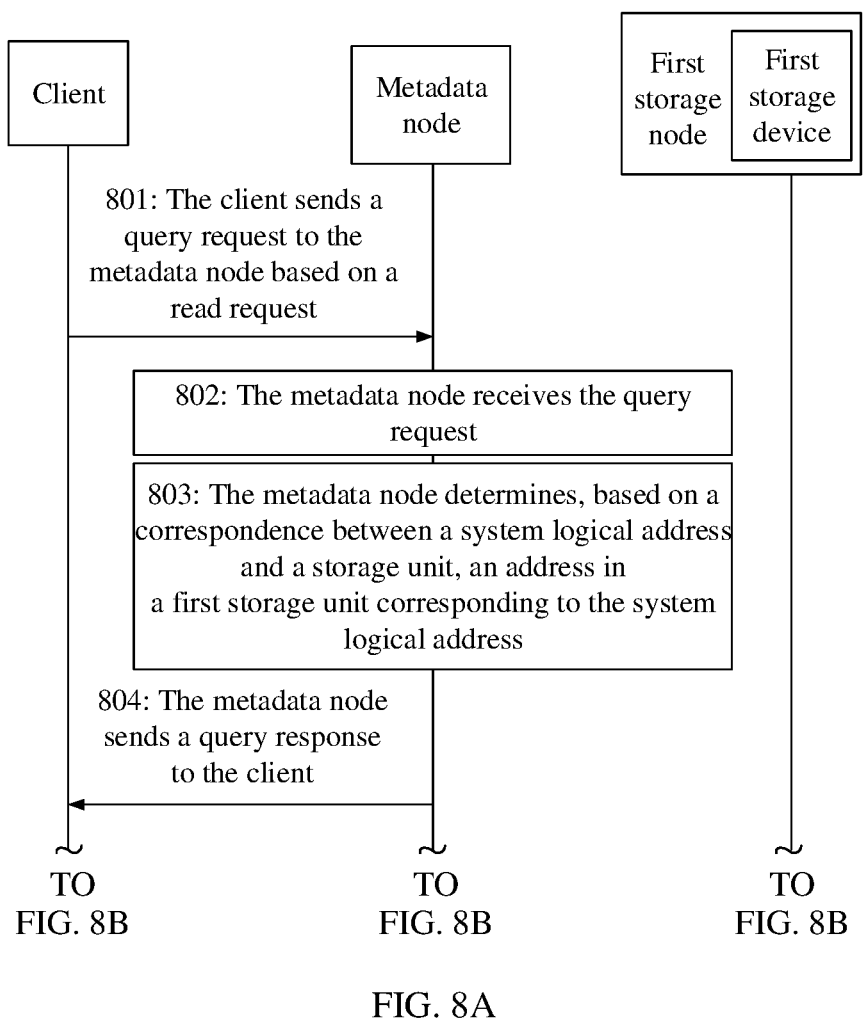
FIG. 8A and FIG. 8B are a flowchart of a data processing method in a storage system according to an embodiment of this application.
Figure 8B:
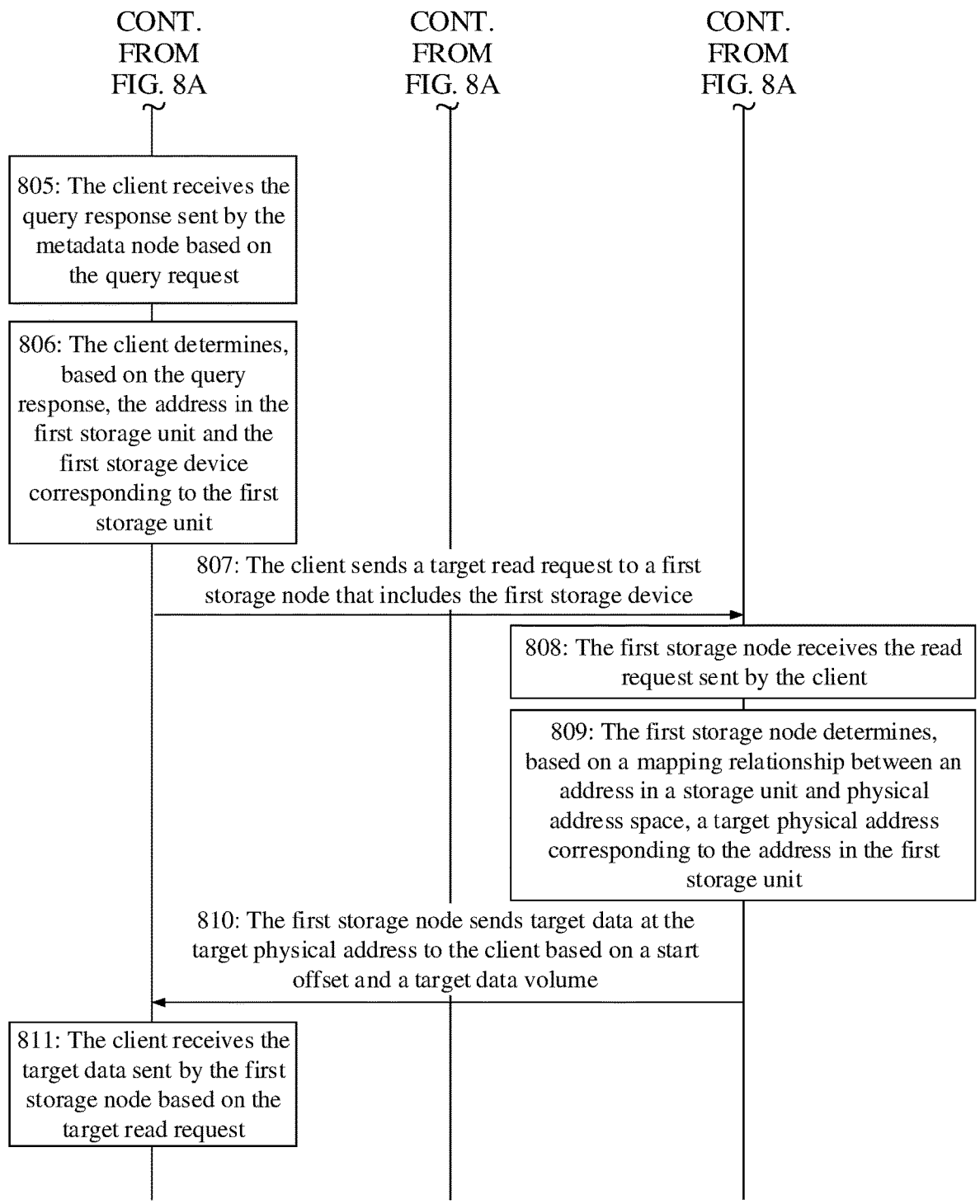

In a data reading process, the client may request, on the metadata node, to query a to-be-read storage unit, and read, based on a correspondence between a queried storage unit and a partition, data stored in a partition corresponding to the storage unit. For further descriptions of the process, refer to a flowchart of a data processing method in a storage system according to an embodiment of this application shown in FIG. 8A and FIG. 8B. The storage system includes a client, a storage node, and a metadata node. A process shown in FIG. 8A and FIG. 8B is described by using an example in which data in a first storage device corresponding to a first storage unit is read.

801: The client sends a query request to the metadata node based on a read request, where the query request is used to indicate the metadata node to query a storage unit corresponding to a system logical address.

The read request may include a data volume of to-be-queried target data, the system logical address, and a start offset of the target data in the storage unit corresponding to the system logical address. The query request may include the system logical address and a query identifier that are carried in the read request, and the query identifier is used to indicate the metadata node to query the storage unit corresponding to the system logical address. For ease of description, the data volume of the target data is denoted as a second data volume.

When the client receives a read request triggered by a user operation, the client may obtain the read request. The client may generate the query request based on the system logical address carried in the read request, and send the query request to the metadata node.

It should be noted that, because the query request carries the system logical address carried in the read request, a process shown by step 801 is also a process in which the client sends the system logical address carried in the read request to the metadata node.

802: The metadata node receives the query request.

803: The metadata node determines, based on a correspondence between the system logical address and a storage unit, an address in a first storage unit corresponding to the system logical address.

The first storage unit is the storage unit corresponding to the system logical address carried in the read request, namely, a to-be-read storage unit. After receiving the query request, the metadata node may obtain the system logical address from the query request, and determine, based on the system logical address and a stored mapping relationship between the system logical address and an address in the storage unit, that the storage unit corresponding to the system logical address is the first storage unit. The metadata node may further determine, based on the first storage unit and a mapping relationship between a storage unit and a partition, a first partition corresponding to the first storage unit, and use each storage device in the first partition as a first storage device. In this case, the first storage device is a to-be-read storage device.

804: The metadata node sends a query response to the client, where the query response is used to indicate the first storage unit corresponding to the system logical address.

The query response may include a device identifier of each storage device in the first partition and the address in the first storage unit, and the query response may further include a partition identifier of the first partition. Because the query response includes the address in the first storage unit, a process shown by step 804 is also a process in which the metadata node sends, to the client, the address in the storage unit corresponding to the system logical address, and a process shown by steps 802 to 804 is also a process in which the client determines, based on the system logical address carried in the read request, the address in the storage unit corresponding to the system logical address.

805: The client receives the query response sent by the metadata node based on the query request.

806: The client determines, based on the query response, the address in the first storage unit and the first storage device corresponding to the first storage unit.

The client may obtain the address in the first storage unit from the query response. When the query response includes a plurality of device identifiers, the client may use, as the first storage device, a storage device indicated by each device identifier carried in the query response. When the query response carries a partition identifier but does not carry a plurality of device identifiers, the client determines, as a to-be-read first partition, a partition indicated by the partition identifier carried in the query response, and determines each storage device in the first partition as the first storage device.

It should be noted that a process shown by steps 801, 805, and 806 is also a process in which the client queries, based on the system logical address carried in the read request, the first storage unit in which the to-be-read target data is located and the first storage device corresponding to the first storage unit.

807: The client sends a target read request to a first storage node that includes the first storage device, where the target read request includes the address in the first storage unit, a target data volume of the target data carried in the read request, a start offset of the target data in the first storage unit, and a device identifier of the first storage device.

The start offset of the target data in the first storage unit is a start location of the target data in the first storage unit.

808: The first storage node receives the read request sent by the client.

A process shown by step 808 may be performed by a network interface card on the first storage node. After the network interface card receives the target read request sent by the client, the network interface card may further determine, based on the device identifier carried in the target read request, that a to-be-read storage device is the first storage device, and forward the target read request to a controller corresponding to the first storage device, and the controller reads the data from the first storage device based on the target read request.

809: The first storage node determines, based on a mapping relationship between an address in a storage unit and physical address space, a target physical address corresponding to the address in the first storage unit.

A process shown by step 809 may be performed by the controller corresponding to the first storage device. After receiving the target read request, the controller may obtain the address in the first storage unit from the target read request. The controller may determine, as target physical address space based on the address in the first storage unit and a stored mapping relationship between a storage unit and a physical address, physical address space that is in the first storage device and that is indicated by a target physical address corresponding to the address in the first storage unit.

810: The first storage node sends target data at the target physical address to the client based on the start offset and the target data volume.

Data in the first storage unit is data stored in target physical address space corresponding to the first storage unit. The start offset is a start location of the target data in the target physical address space. It should be noted that, because storage space of a storage unit may be provided by physical address space indicated by at least one physical address, the target physical address space is physical address space indicated by at least one physical address corresponding to the first storage unit.

A process shown by step 810 may be performed by the first storage device. In a possible implementation, step 810 may be implemented by a process shown by the following steps 810*a* and 810*b*.

Step 810*a*: The first storage device reads the target data from the start offset in the target physical address based on the target data volume of the target data carried in the target read request.

A process shown by step 810*a* may be performed by the controller corresponding to the first storage device. The controller may determine, based on the start offset, a start location of the target data in the target physical address space indicated by the target physical address, and read data of the target data volume from the start location, to obtain the target data. For example, if the start offset is 20 M, and the target data volume is 30 M, the controller may use, as second data, data that is in the target physical address space and that is located in (20 M, 50 M].

Step 810*b*: The first storage device sends the target data to the client.

After obtaining the target data, the controller may send, to the network interface card of the first storage node, a read complete response that carries the target data, and the network interface card forwards the read complete response to the client.

It should be noted that a process shown by steps 809 and 810 is also a process in which the first storage device obtains the target data from the first storage device based on the address in the first storage unit, the target data volume of the target data carried in the read request, and the start offset of the target data in the first storage unit.

811: The client receives the target data sent by the first storage node based on the target read request.

The client may receive a read complete response sent by the first storage node, and obtain the target data from the read complete response.

It should be noted that when the client reads the first data in the storage system, if a redundancy coding scheme of the storage system is K-copy coding, the client needs to read data only once in any storage device in the first partition, that is, a process shown by step 807 to step 811, and the target data obtained by the client is the first data. If the redundancy coding scheme of the storage system is EC coding, the client needs to read data once from each storage device in the first partition, and perform EC decoding on the target data read from each storage device in the first partition, to obtain the first data. The target data read from each storage device in the first partition is a data block or a check block that is of the first data and that is written to the first partition when the client stores the first data.

Figure 9:
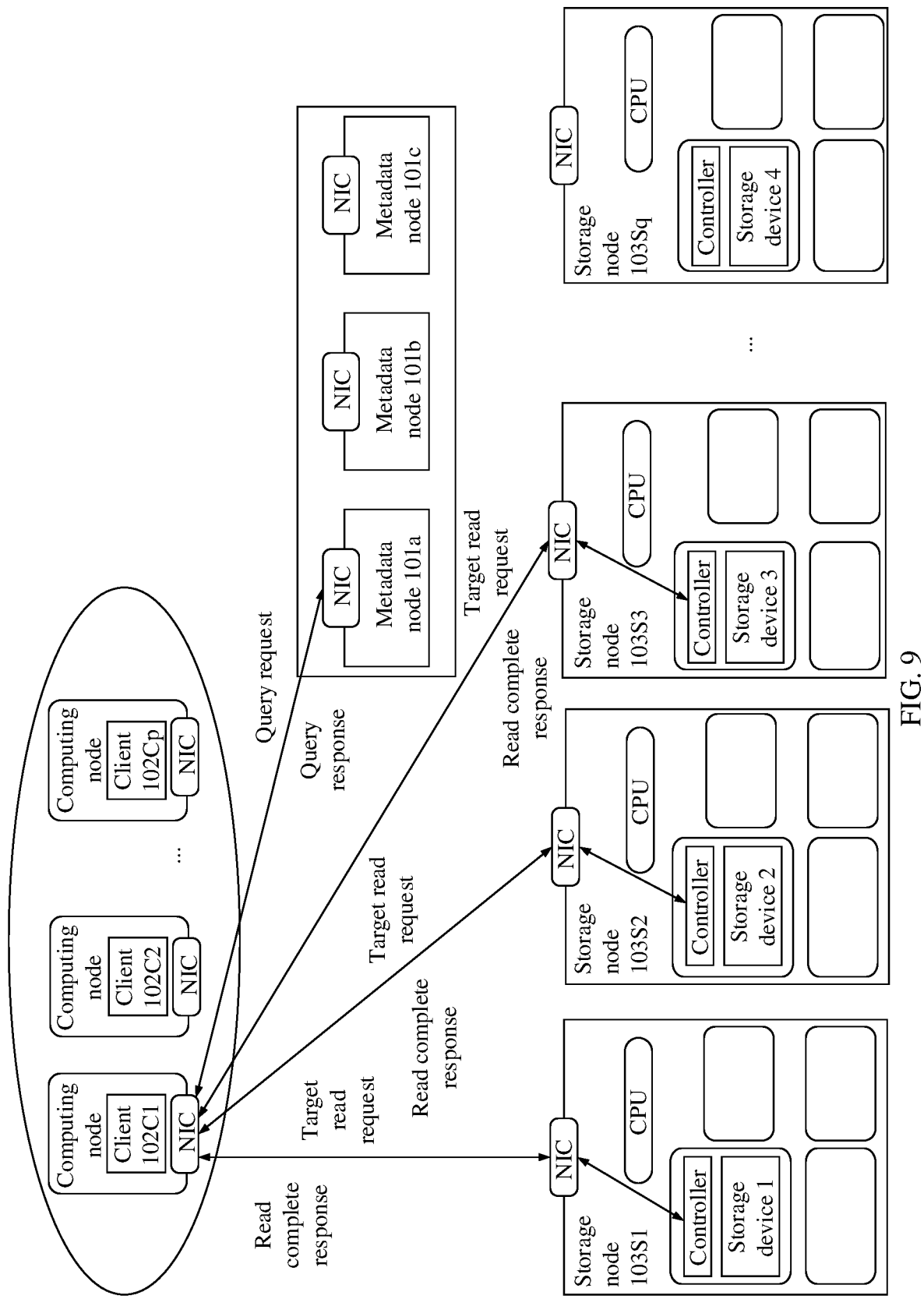
FIG. 9 is a schematic diagram of data reading in a storage system according to an embodiment of this application.

When the redundancy coding scheme of the storage system is EC coding, for further descriptions, for a process in which the client reads the first data, refer to a schematic diagram of data reading in the storage system according to an embodiment of this application shown in FIG. 9. In FIG. 9, for example, the client is 102C1, the client 102C1 sends a query request to a metadata node 101*a*, the metadata node 101*a* sends a query response to the client 102C1 based on the query request, and the client 102C1 may determine, based on the query response, a to-be-queried first storage unit and a first partition corresponding to the first storage unit. The first partition may include a storage device 1 in a storage node 103S1, a storage device 2 in a storage node 103S2, and a storage device 3 in a storage node 103S3. The client 102C1 separately sends a target read request to the storage node 103S1, the storage node 103S2, and the storage node 103S3 in a redundancy coding mode of the storage system. Controllers of the storage device 1, the storage device 2, and the storage device 3 may receive a target read request, and separately read one piece of target data from the storage device 1, the storage device 2, and the storage device 3. The storage node 103S1, the storage node 103S2, and the storage node 103S3 send the target data read by the controller to the client 102C1. The client 102C1 performs EC decoding on the target data sent by the storage node 103S1, the storage node 103S2, and the storage node 103S3, to obtain the first data.

According to the method provided in this embodiment of this application, the client determines an address that is in the storage unit and that is used to store to-be-read data, sends the address in the storage unit, the target data volume of the target data, and the start offset of the target data in the storage unit to the first storage device that is in the storage node and that is corresponding to the storage unit, and the first storage device returns the target data to the client while a CPU of the storage node does not need to determine a hard disk LBA corresponding to virtual address space and a hard disk does not need to determine a corresponding physical address based on the hard disk LBA. In this way, a data reading delay is reduced, and data reading efficiency is improved. In addition, a data reading process is performed by a controller corresponding to the to-be-read storage unit in the storage node, and does not need to be performed by the CPU of the storage node, so that CPU overheads in the storage node are reduced.

Figure 10:
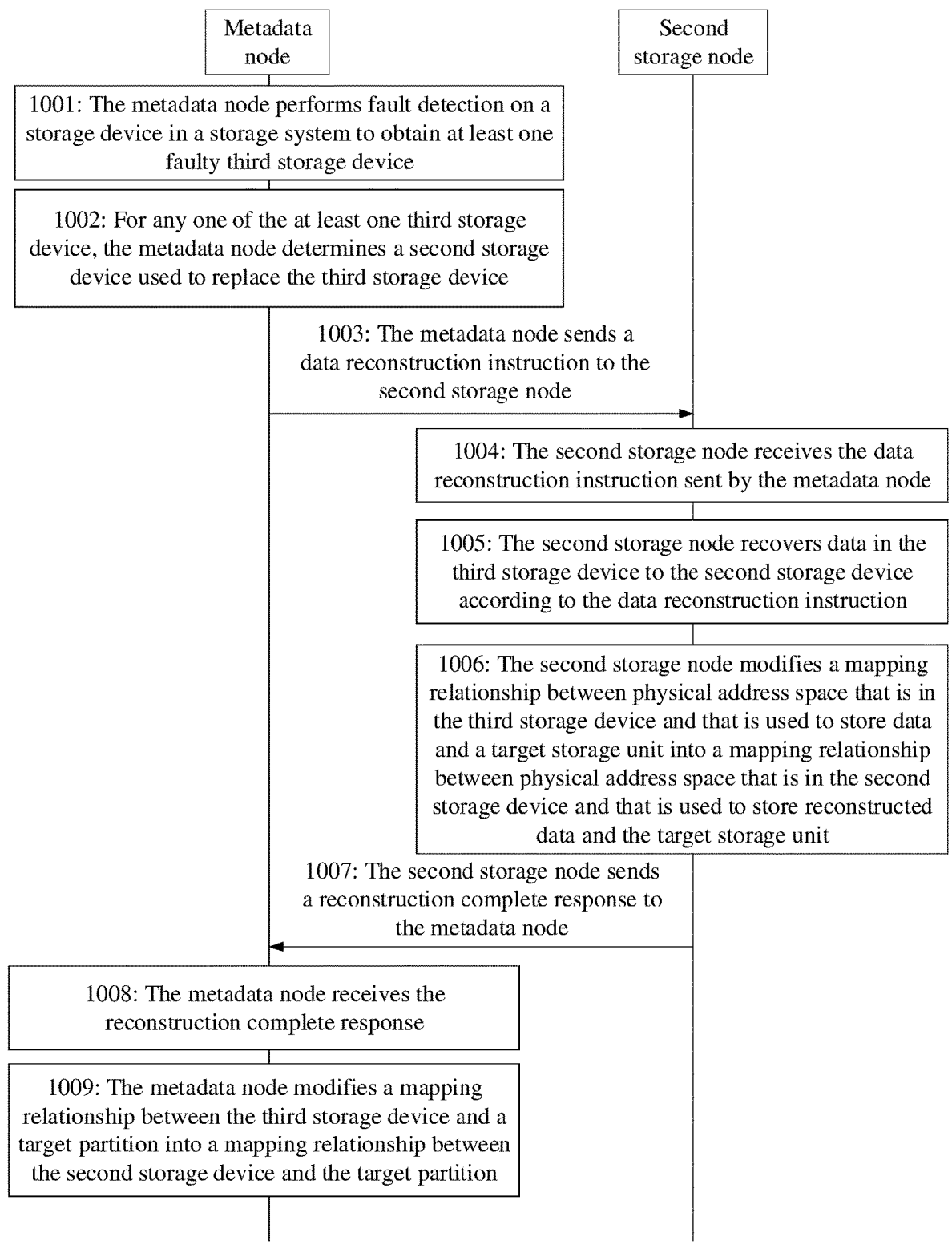
FIG. 10 is a flowchart of a data processing method in a storage system according to an embodiment of this application.

When any storage device in any partition in the storage system is faulty, the metadata node sends a reconstruction instruction to a storage node on which a primary storage device in the partition is located, to instruct the storage node to reconstruct data stored in the faulty storage device to a second storage device. For further descriptions of the process, refer to a flowchart of a data processing method in a storage system according to an embodiment of this application shown in FIG. 10. The storage system includes a client, a metadata node, and a storage node.

1001: The metadata node performs fault detection on a storage device in the storage system to obtain at least one faulty third storage device.

The third storage device is a faulty storage device in the storage system. The metadata node may send, after each detection period, a first detection instruction to a storage node on which each storage device is located. The first detection instruction is used to instruct each storage node to detect whether a storage device in each storage node is faulty. When no storage device in any storage node is faulty, the storage node may send a first detection complete response to the metadata node. The first detection complete response is used to indicate that no storage device in the storage node is faulty. When any storage device in the storage node is faulty, the storage node may send a second detection complete response to the metadata node, and the second detection complete response may include a device identifier of the faulty storage device, to notify the metadata node of the faulty storage device. The faulty storage device is the third storage device.

Alternatively, the metadata node may further send a second detection instruction to a storage node on which a primary storage device in each partition is located, and the second detection instruction is used to instruct the storage node on which the primary storage device in each partition is located to perform heartbeat detection on a secondary storage device in each partition after each detection period, to detect whether the storage device in each partition is faulty. After receiving the second detection instruction, a storage node on which a primary storage device in any partition is located may send, after each detection period, a second detection instruction to a storage node on which each secondary storage device in the partition is located. If the storage node on which each secondary storage device is located sends, based on the second detection instruction, a second detection complete response to the storage node on which the primary storage device is located, it indicates that no secondary storage device in the partition is faulty, and the second detection complete response is used to indicate that no secondary storage device is faulty. When the storage node on which the primary storage device is located does not receive a second detection complete response sent by a storage node on which any secondary storage device is located, it indicates that the secondary storage device is faulty, and the storage node on which the primary storage device is located may report a message indicating that the secondary storage device is faulty to the metadata node, so that the metadata node may use the secondary storage device as the third storage device.

1002: For any one of the at least one third storage device, the metadata node determines a second storage device used to replace the third storage device.

The second storage device is not faulty. The second storage device may alternatively be any unfaulty storage device outside a target partition. The target partition is a partition to which the third storage device belongs. When the third storage device is the foregoing first storage device, the target partition is the first partition.

The metadata node may use any storage device in the storage system as the second storage device. It may be understood that the second storage device may be a storage device that is newly mounted in the storage system, or the second storage device may use any storage device with relatively low load outside the target partition in the storage system. That load of the storage device is relatively low means that a relatively small amount of data is currently stored in the storage device, and a large quantity of physical address space of the storage device stores no data.

1003: The metadata node sends a data reconstruction instruction to a second storage node, where the data reconstruction instruction is to instruct the second storage node to reconstruct data in the third storage device to the second storage device.

The second storage node is a storage node on which the primary storage device in the target partition is located, and the data reconstruction instruction may include a device identifier of the third storage device, a device identifier of the second storage device, and an identifier of the primary storage device in the target partition. The data reconstruction instruction may further include a reconstruction identifier, the reconstruction identifier is used to indicate the second storage node to recover data in the third storage device to the second storage device, and the data reconstruction instruction may further include address information of a third storage node on which the second storage device is located.

1004: The second storage node receives the data reconstruction instruction sent by the metadata node.

A process shown by step 1004 may be performed by a network interface card on the second storage node. After the network interface card receives the data reconstruction instruction, the network interface card may further determine, based on the device identifier of the primary storage device that is carried in the data reconstruction instruction, a controller corresponding to the primary storage device, and forward the data reconstruction instruction to the controller corresponding to the primary storage device, and the controller recovers, according to the data reconstruction instruction, data stored in the third storage device to the second storage device.

1005: The second storage node recovers the data in the third storage device to the second storage device according to the data reconstruction instruction.

A process shown by step 1005 may be implemented by the controller corresponding to the primary storage device in the target partition in the second storage node. After receiving the data reconstruction instruction, the controller may determine, based on the identifier of the third storage device that is in the data reconstruction instruction, that to-be-recovered data belongs to the third storage device, and may determine, based on the identifier of the second storage device that is in the data reconstruction instruction, that the second storage device is to be used to recover the data.

The controller may reconstruct, based on data stored in an unfaulty storage device in the target partition, the data stored in the third storage device, to obtain reconstructed data (that is, recovered data). For different redundancy coding schemes, a process in which the controller reconstructs, based on the data stored in the unfaulty storage device in the target partition, the data stored in the third storage device is different.

In a possible implementation, when a redundancy coding scheme of the storage system is K-copy coding, it indicates that the data stored in the third storage device is the same as data stored in another storage device in the target partition, the controller obtains, from the primary storage device, the data stored in the primary storage device, and the controller may use, as the reconstructed data, the data stored in the primary storage device.

In a possible implementation, when the redundancy coding scheme of the storage system is EC coding, it indicates that data stored in another storage device in the target partition is required to reconstruct the data stored in the third storage device. In this case, the controller may send a data obtaining request to a storage node on which each unfaulty secondary storage device in the target storage device is located, and each data obtaining request is used to request to obtain data stored in the secondary storage device. After a storage node on which any secondary storage device is located receives the data obtaining request, the storage node on which the secondary storage device is located sends data stored in the secondary storage device to the second storage node, so that the controller corresponding to the primary storage device may receive data stored in each unfaulty secondary storage device, and the controller may further obtain, from the primary storage device, the data stored in the primary storage device. After the controller obtains data stored in each unfaulty secondary storage device in the target partition and the data stored in the primary storage device, the controller may reconstruct, based on the data stored in each unfaulty secondary storage device, the data stored in the primary storage device, and check data used in EC coding, the data stored in the third storage device, to obtain the reconstructed data.

The controller stores a mapping relationship between a physical address that is in each storage device in the target partition and at which data has been stored and a storage unit. In addition, all storage devices in the target partition correspond to a same storage unit, and the controller may determine, based on the identifier of the third storage device and the stored mapping relationship between a physical address that is in each storage device and at which data has been stored and a storage unit, a target storage unit corresponding to a physical address that is in the third storage device and at which data has been stored. The physical address that is in the third storage device and at which data has been stored may correspond to at least one target storage unit. When the third storage device is the first storage device, the at least one target storage unit may include the first storage unit.

The controller may further obtain, from the data reconstruction instruction, the address information of the third storage node on which the second storage device is located. The controller sends a first target write request to the third storage node based on the address information of the third storage node. The first target write request is used to indicate to write the reconstructed data to the second storage device. The target write request may include the device identifier of the second storage device, an address in the target storage unit, and the reconstructed data.

After the third storage node receives the first target write request, the third storage node may write the reconstructed data to the second storage device based on the first target write request. After a controller corresponding to the second storage device in the third storage node writes the reconstructed data to the second storage device, the controller may further establish a mapping relationship between a physical address that is in the second storage device and that is used to store the reconstructed data and the address in the target storage unit. The controller may further send a target write complete response to the second storage node, and the target write complete response includes a physical address of physical address space that is in the second storage device and that is used to store the reconstructed data. A process in which the third storage node writes the reconstructed data to the second storage device based on the target write request is the same as a process in which the first storage node writes the first data to the at least one first physical address space in the first storage device based on the target write request in step 610. In this embodiment of this application, the process in which the third storage node writes the reconstructed data to the second storage device based on the target write request is not described.

1006: The second storage node modifies a mapping relationship between the physical address space that is in the third storage device and that is used to store data and the target storage unit into a mapping relationship between the physical address space that is in the second storage device and that is used to store the reconstructed data and the target storage unit.

A process shown by step 1006 may be implemented by the controller corresponding to the primary storage device in the target partition in the second storage node. The controller may receive a target write complete response sent by the third storage node. The controller may obtain, from the target write complete response, the physical address of the physical address space that is in the second storage device and that is used to store the reconstructed data, so that the controller may modify the stored mapping relationship between the physical address space that is in the third storage device and that is used to store data and the target storage unit into a mapping relationship between the physical address of the physical address space that is in the second storage device and that is used to store the reconstructed data and the target storage unit.

When the third storage device is the first storage device, a process shown by steps 1005 and 1006 is also a process in which after the first storage device is faulty, the second storage device stores the recovered to-be-written data to a physical address of the second storage device, and the second storage device establishes a mapping relationship between an address that is in the storage unit and that is used to store the to-be-written data and the physical address of the second storage device.

1007: The second storage node sends a reconstruction complete response to the metadata node, where the reconstruction complete response is used to indicate that the data stored in the third storage device has been recovered to the second storage device.

1008: The metadata node receives the reconstruction complete response.

1009: The metadata node modifies a mapping relationship between the third storage device and the target partition into a mapping relationship between the second storage device and the target partition.

When the metadata node receives the reconstruction complete response, it indicates that in this case, the second storage node has recovered the data in the third storage device to the second storage device, and the metadata node modifies the stored mapping relationship between the third storage device and the target partition into the mapping relationship between the second storage device and the target partition, to replace the third storage device in the target partition with the second storage device.

Figure 11:
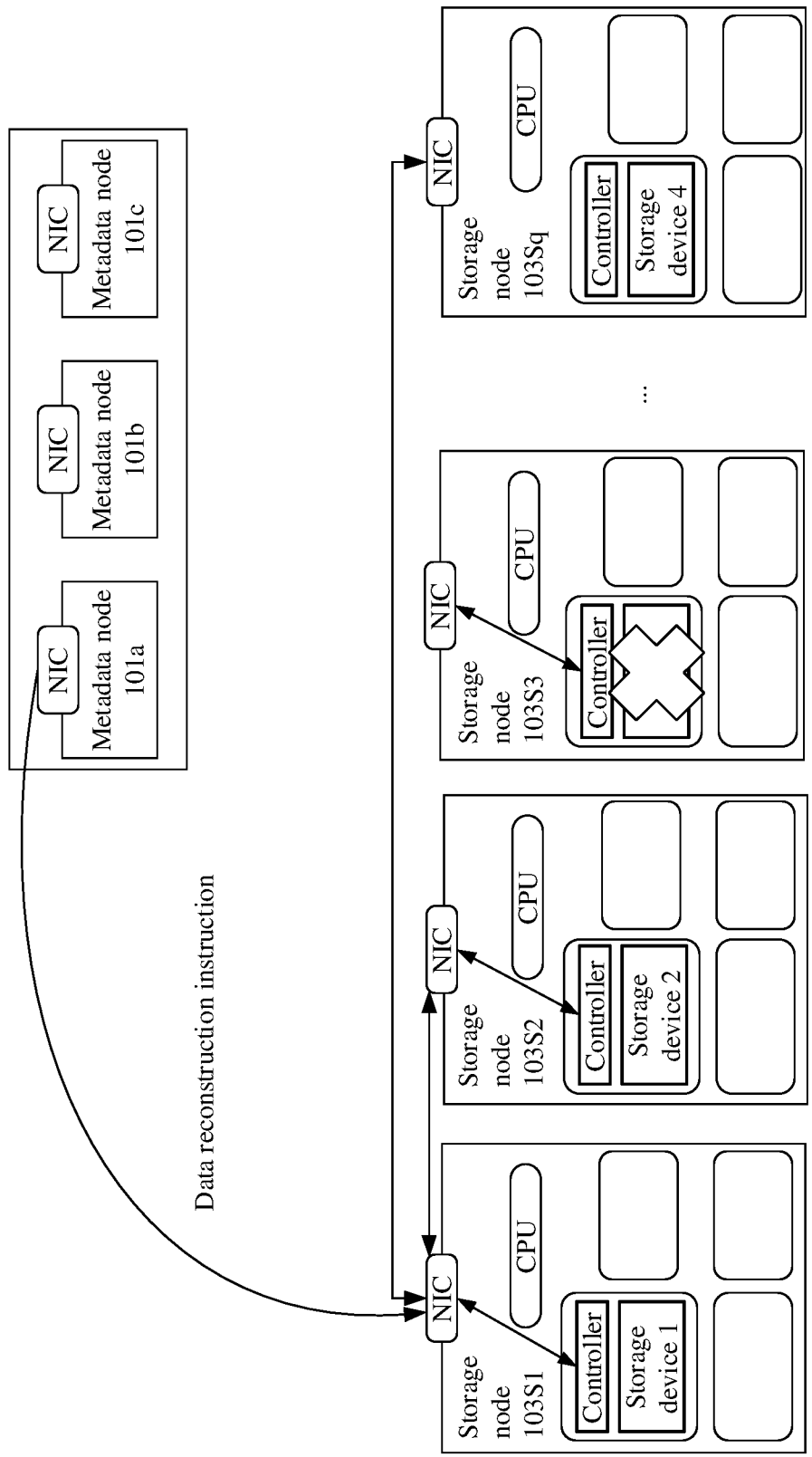
FIG. 11 is a schematic diagram of data reconstruction in a storage system according to an embodiment of this application.

For further descriptions of a process shown by 1001 to 1009, refer to a schematic diagram of data reconstruction in a storage system according to an embodiment of this application shown in FIG. 11. In FIG. 11, a target partition includes a storage device 1 (a primary storage device) in a storage node 103S1, a storage device 2 in a storage node 103S2, and a storage device 3 in a storage node 103S3, the storage device 3 is faulty, and a second storage device is a storage device 4 in a storage node 103Sq. For example, a network interface card is an NIC, a metadata node 101a sends a data reconstruction instruction to the storage node 103S1, and the data reconstruction instruction includes device identifiers of the storage devices 3 and 4. After receiving the data reconstruction instruction, a controller corresponding to the storage device 1 in the storage node 103S1 obtains data stored in the storage device 1 from the storage device 1, and obtains data stored in the storage device 2 from the storage node 103S2. The controller reconstructs, based on the data stored in the storage device 1, the data stored in the storage device 2, and check data used in EC coding, data stored in the storage device 3. The controller writes, to the storage device 4 in the storage node 103Sq, the reconstructed data stored in the storage device 3. After completing writing, the controller may modify a mapping relationship between physical address space that is in the storage device 3 and that stores data and the target storage unit into a mapping relationship between physical address space that is in the storage device 4 and that stores the reconstructed data and the target storage unit, and the metadata node 101a may modify a stored mapping relationship between the storage device 3 and the target partition into a mapping relationship between the storage device 4 and the target partition, to replace the storage device 3 in the target partition with the storage device 4.

Based on the method provided in this embodiment of this application, the second storage node reconstructs data stored in the faulty third storage unit, and writes the reconstructed data to the second storage unit. After writing is completed, only the second storage node needs to modify the mapping relationship between the physical address space that is in the third storage unit and that stores data and the target storage unit into the mapping relationship between the physical address space that is in the second storage device and that is used to store the reconstructed data and the target storage unit, and only the metadata node needs to modify the mapping relationship between the third storage unit and the target partition into the mapping relationship between the second storage unit and the target partition, and the metadata node does not need to modify other content. Therefore, there is little content whose information needs to be updated in a construction process, so that overheads brought by information updating are reduced. In addition, a data construction process is performed by a controller corresponding to a storage device in the storage node, and does not need to be performed by a CPU of the storage node, so that CPU overheads in the storage node are reduced.

Figure 12:
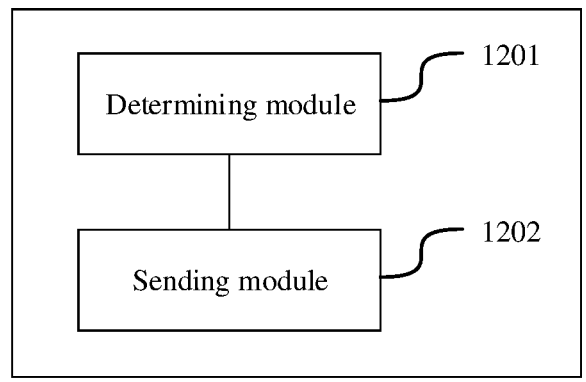
FIG. 12 is a schematic diagram of a structure of a data processing apparatus according to an embodiment of this application.

FIG. 12 is a schematic diagram of a structure of a data processing apparatus according to an embodiment of this application. The apparatus includes: a determining module 1201, configured to determine, based on to-be-written data carried in a write request, an address that is in a storage unit and that is used to store the to-be-written data; and a sending module 1202, configured to send the address in the storage unit and the to-be-written data to a first storage device corresponding to the storage unit, where the address in the storage unit is not a logical block address (LBA), and the first storage device is included in a storage node.

Optionally, the determining module 1201 is configured to: send a data volume of the to-be-written data to a metadata node; and receive the address in the storage unit that is generated by the metadata node based on the data volume of the to-be-written data.

Optionally, the apparatus further includes: a first determining module, configured to determine a partition based on a correspondence between the storage unit and the partition, where the partition includes a plurality of storage devices; and a second determining module, configured to query the partition to determine the first storage device, where the first storage device is a storage device in the partition.

Optionally, the sending module 1202 is configured to: send the address in the storage unit and the to-be-written data to a network interface card of the storage node.

Optionally, the apparatus further includes a third determining module and a receiving module.

The third determining module is configured to determine, based on a system logical address carried in a read request, an address that is in the storage unit and that is corresponding to the system logical address.

The sending module 1202 is further configured to send the address in the storage unit, a target data volume of target data carried in the read request, and a start offset of the target data in the storage unit to the first storage device corresponding to the storage unit.

The receiving module is configured to receive the target data sent by the first storage device.

Optionally, the third determining module is configured to: send the system logical address carried in the read request to the metadata node; and receive the address that is in the storage unit and corresponding to the system logical address and that is sent by the metadata node.

Figure 13:
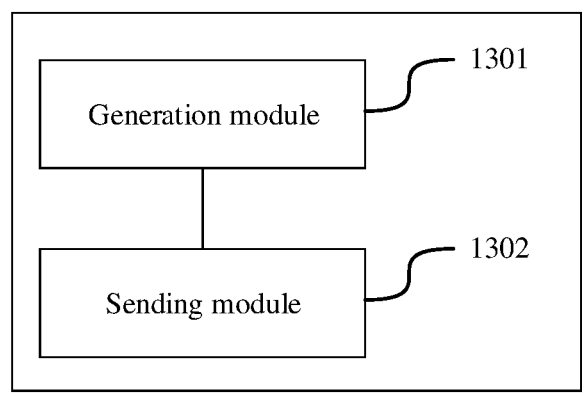
FIG. 13 is a schematic diagram of a structure of a data processing apparatus according to an embodiment of this application.

FIG. 13 is a schematic diagram of a structure of a data processing apparatus according to an embodiment of this application. The apparatus includes: a generation module 1301, configured to generate an address in a storage unit based on a data volume of to-be-written data sent by a client, where the address in the storage unit is not a logical block address (LBA); and a sending module 1302, configured to send the address in the storage unit to the client.

Optionally, the apparatus further includes: a receiving module, configured to receive a system logical address sent by the client; and a determining module, configured to determine, based on a mapping relationship between the system logical address and the address in the storage unit, a storage unit corresponding to the system logical address.

The sending module 1302 is further configured to send, to the client, the storage unit corresponding to the system logical address.

Figure 14:
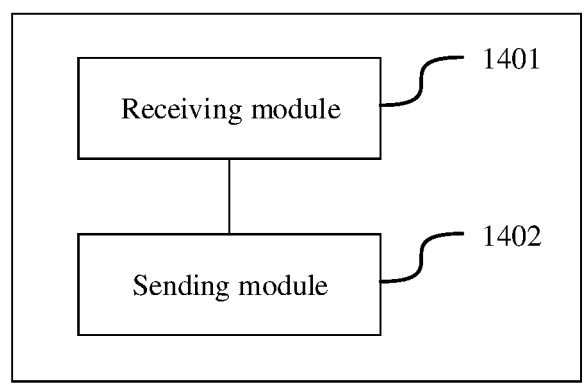
FIG. 14 is a schematic diagram of a structure of a data processing apparatus according to an embodiment of this application.

FIG. 14 is a schematic diagram of a structure of a data processing apparatus according to an embodiment of this application. The apparatus includes: a receiving module 1401, configured to receive an address in a storage unit and to-be-written data carried in a write request that are sent by a client; and a sending module 1402, configured to send the address in the storage unit and the to-be-written data to a first storage device that is in the apparatus and that is corresponding to the storage unit.

Optionally, the apparatus further includes: a storage module, configured to store the recovered to-be-written data to a physical address of a second storage device after the first storage device is faulty; and an establishment module, configured to establish a mapping relationship between the address in the storage unit and the physical address of the second storage device.

Optionally, the apparatus further includes a determining module and a reading module.

The receiving module 1401 is further configured to receive the address in the storage unit that is sent by the client, a target data volume of target data, and a start offset of the target data in the storage unit.

The determining module is configured to determine, based on a mapping relationship between the address in the storage unit and a physical address, a target physical address corresponding to the address in the storage unit.

The reading module is configured to read data of the target data volume from the start offset in the target physical address to obtain the target data.

The sending module is further configured to send the target data to the client.

All of the foregoing optional technical solutions may form optional embodiments of this disclosure through any combination. Details are not described herein again.

It should be noted that when the data processing apparatus provided in the foregoing embodiment processes data, division of the foregoing functional modules is used only as an example for description. In actual application, the foregoing functions may be allocated to different functional modules and implemented according to a requirement, that is, an inner structure of the apparatus is divided into different functional modules to implement all or some of the functions described above. In addition, the data processing apparatus belongs to a same concept as the embodiment of the data processing method in a storage system provided in the foregoing embodiments. For a specific implementation process of the data processing apparatus in a storage system, refer to the method embodiment. Details are not described herein.

A person of ordinary skill in the art may understand that all or some of the steps of the embodiments may be implemented by hardware or a program instructing related hardware. The program may be stored in a computer-readable storage medium. The storage medium may be a read-only memory, a hard disk, an optical disc, or the like.

The foregoing descriptions are merely optional embodiments of this application, and are not intended to limit this application. Any modification, equivalent replacement, or improvement made within the principle of this application shall fall within the protection scope of this application.

What is claimed is:

1. A storage system, comprising:
 a client; and
 a storage node comprising a first storage device;
 wherein the client is configured to:
  receive, from a metadata node, identifiers of multiple partitions, and identifiers of storage devices comprised in each of the multiple partitions, wherein the multiple partitions are partitions managed by the metadata node;
  obtain a write request, where the write request carries to-be-written data;
  in response to obtaining the write request, send, to the metadata node, an allocation request, where the allocation request is used to indicate the metadata node to allocate a storage unit to the to-be-written data;
  receive, from the metadata node, an allocation response, wherein the allocation response comprises an address of a first storage unit and an identifier of a first partition that is corresponding to the first storage unit and that is in the multiple partitions;
  determine, according to the identifier of the first partition and the identifiers of storage devices comprised in each of the multiple partitions, the first storage device corresponding to the first storage unit, wherein the first partition comprises the first storage device; and
  send a target write request to the first storage device, the target write request comprising the address of the first storage unit and the to-be-written data; and
 wherein the first storage device is configured to:
  in response to receiving the target write request, store the to-be-written data to the first storage device; and
  in response to receiving the target write request, establish a mapping relationship between the address of the first storage unit and a physical address of the to-be-written data in the first storage device, wherein the address of the first storage unit is an identity (ID) of the first storage unit and is not a hard disk logical block address (LBA).

2. The storage system according to claim 1, further comprising:
 a metadata node;
 wherein the client is further configured to:
  send a data volume of the to-be-written data to the metadata node; and
 wherein the metadata node is configured to:
  generate the address of the first storage unit based on the data volume of the to-be-written data.

3. The storage system according to claim 1, wherein the client being configured to send the address of the first storage unit and the to-be-written data to the first storage device comprises the client being configured to:
 send the address of the first storage unit and the to-be-written data to a network interface card of the storage node; and
 wherein the network interface card of the storage node is configured to:
  send the address of the first storage unit and the to-be-written data to the first storage device.

4. The storage system according to claim 1, further comprising:
 a second storage device, configured to:
  store recovered to-be-written data to a physical address of the second storage device after the first storage device becomes faulty; and
  establish a mapping relationship between the address of the first storage unit and the physical address of the second storage device.

5. The storage system according to claim 1, further comprising a plurality of metadata nodes, each metadata node of the plurality of metadata nodes being configured to manage one or more storage devices in the storage system.

6. The storage system according to claim 1, further comprising:
 a first metadata node, configured to divide storage devices managed by the first metadata node, to obtain a plurality of partitions.

7. The storage system according to claim 6, wherein each partition of the plurality of partitions is indicated by an identifier, and different partitions are indicated by different identifiers.

8. A method, comprising:
 receiving, from a metadata node, identifiers of multiple partitions, and identifiers of storage devices comprised in each of the multiple partitions, wherein the multiple partitions are partitions managed by the metadata node;
 obtaining a write request, where the write request carries to-be-written data;
 in response to obtaining the write request, sending, to the metadata node, an allocation request, where the allocation request is used to indicate the metadata node to allocate a storage unit to the to-be-written data;
 receiving, from the metadata node, an allocation response, wherein the allocation response comprises an address of a first storage unit and an identifier of a first partition that is corresponding to the first storage unit and that is in the multiple partitions;
 determining, according to the identifier of the first partition and the identifiers of storage devices comprised in each of the multiple partitions, a first storage device corresponding to the first storage unit, wherein the first partition comprises the first storage device, and wherein a storage system comprises a client and a storage node, and the storage node comprises a first storage device;
 sending, by the client, a target write request to the first storage device, wherein the target write request comprises the address of the first storage unit and the to-be-written data;
 in response to receiving the target write request, storing, by the first storage device, the to-be-written data to the first storage device; and
 in response to receiving the target write request, establishing, by the first storage device, a mapping relationship between the address of the first storage unit and a physical address of the to-be-written data in the first storage device, wherein the address of the first storage unit is an identity (ID) of the first storage unit and is not a logical block address (LBA).

9. The method according to claim 8, wherein the storage system further comprises the metadata node; and
 wherein the method further comprises:
  sending, by the client, a data volume of the to-be-written data to the metadata node; and
  wherein the metadata node generates the address of the first storage unit based on the data volume of the to-be-written data.

10. The method according to claim 8, wherein sending, by the client, the address of the first storage unit and the to-be-written data to the first storage device comprises:
sending, by the client, the address of the first storage unit and the to-be-written data to a network interface card of the storage node, wherein the network interface card of the storage node sends the address of the first storage unit and the to-be-written data to the first storage device.

11. The method according to claim 8, further comprising:
storing, by a second storage device of the storage system, recovered to-be-written data to a physical address of the second storage device after the first storage device is faulty; and
establishing, by the second storage device, a mapping relationship between the address of the first storage unit and the physical address of the second storage device.

12. The method according to claim 8, wherein the storage system further comprises a plurality of metadata nodes, each metadata node of the plurality of metadata nodes being configured to manage one or more storage devices in the storage system.

13. The method according to claim 8, wherein the storage system further comprises a first metadata node, configured to divide storage devices managed by the first metadata node, to obtain a plurality of partitions.

14. The method according to claim 13, wherein each partition of the plurality of partitions is indicated by an identifier, and different partitions are indicated by different identifiers.

15. A computing node, comprising:
a memory, and
at least one processor coupled to the memory and configured to:
receive, from a metadata node, identifiers of multiple partitions, and identifiers of storage devices comprised in each of the multiple partitions, wherein the multiple partitions are partitions managed by the metadata node;
obtain a write request, where the write request carries to-be-written data;
in response to obtaining the write request, send, to the metadata node, an allocation request, where the allocation request is used to indicate the metadata node to allocate a storage unit to the to-be-written data;
receive, from the metadata node, an allocation response, wherein the allocation response comprises an address of a first storage unit and an identifier of a first partition that is corresponding to the first storage unit and that is in the multiple partitions;
determine, according to the identifier of the first partition and the identifiers of storage devices comprised in each of the multiple partitions, a first storage device corresponding to the first storage unit, wherein the first partition comprises the first storage device; and
send a target write request to the first storage device, wherein the target write request comprises the address of the first storage unit and the to-be-written data, and wherein the address of the first storage unit is an identity (ID) of the first storage unit and is not a logical block address (LBA).

16. The computing node according to claim 15, wherein the at least one processor is further configured to:
send a data volume of the to-be-written data to the metadata node, the metadata node being in a storage system comprising the computing node; and
wherein the address of the first storage unit is generated by the metadata node based on the data volume of the to-be-written data.

17. The computing node according to claim 15, wherein the at least one processor is further configured to:
send the address of the first storage unit and the to-be-written data to a network interface card of a storage node.

18. The computing node according to claim 15, wherein the at least one processor is further configured to:
request a metadata node to allocate the first storage unit.

19. The computing node according to claim 15, wherein the write request is triggered by a user operation.

* * * * *